United States Patent
Takayama et al.

(10) Patent No.: US 12,215,057 B2
(45) Date of Patent: Feb. 4, 2025

(54) CEMENT ADDITIVE, CEMENT ADMIXTURE, CEMENT COMPOSITION, MOLDED BODY, AND METHOD FOR IMPROVING STRENGTH OF MOLDED BODY

(71) Applicant: Nippon Shokubai Co., Ltd., Osaka (JP)

(72) Inventors: Takeshi Takayama, Osaka (JP); Kunihiko Ishizaki, Hyogo (JP); Shigeru Sakamoto, Hyogo (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 678 days.

(21) Appl. No.: 17/602,081

(22) PCT Filed: Mar. 24, 2020

(86) PCT No.: PCT/JP2020/013157
§ 371 (c)(1),
(2) Date: Oct. 7, 2021

(87) PCT Pub. No.: WO2020/209057
PCT Pub. Date: Oct. 15, 2020

(65) Prior Publication Data
US 2022/0212995 A1    Jul. 7, 2022

(30) Foreign Application Priority Data
Apr. 9, 2019 (JP) .................... 2019-074148

(51) Int. Cl.
| C04B 24/26 | (2006.01) |
| C04B 24/04 | (2006.01) |
| C04B 28/02 | (2006.01) |
| C04B 40/00 | (2006.01) |
| C04B 103/00 | (2006.01) |
| C04B 103/40 | (2006.01) |
| C08F 220/20 | (2006.01) |
| C08F 220/28 | (2006.01) |
| C08F 220/56 | (2006.01) |
| C08L 33/26 | (2006.01) |

(52) U.S. Cl.
CPC .......... *C04B 24/2652* (2013.01); *C04B 24/04* (2013.01); *C04B 24/2641* (2013.01); *C04B 28/02* (2013.01); *C04B 40/0039* (2013.01); *C08F 220/20* (2013.01); *C08F 220/286* (2020.02); *C08F 220/56* (2013.01); *C08L 33/26* (2013.01); *C04B 24/2647* (2013.01); *C04B 2103/0046* (2013.01); *C04B 2103/0051* (2013.01); *C04B 2103/0062* (2013.01); *C04B 2103/408* (2013.01)

(58) Field of Classification Search
CPC . C04B 24/2652; C04B 24/04; C04B 24/2641; C04B 2103/0046; C04B 2103/0051; C04B 2103/408; C04B 40/0039; C08F 220/56; C08F 220/286; C08F 222/385; C08F 220/06; C08L 33/26; C08L 33/064
See application file for complete search history.

(56) References Cited

U.S. PATENT DOCUMENTS

| 2007/0100028 A1 | 5/2007 | Mang |
| 2011/0095227 A1 | 4/2011 | Herth et al. |
| 2018/0251401 A1* | 9/2018 | Takayama ............. C08F 290/06 |

FOREIGN PATENT DOCUMENTS

| CN | 103113508 A | 5/2013 | |
| CN | 105481470 A | 4/2016 | |
| CN | 105776998 B | 5/2018 | |
| CN | 108913052 A | 11/2018 | |
| JP | S63-291840 A | 11/1988 | |
| JP | H01-261250 A | 10/1989 | |
| JP | H04-346833 A | 12/1992 | |
| JP | H09-002854 A | 1/1997 | |
| JP | H10-001343 A | 1/1998 | |
| JP | 10101392 A * | 4/1998 | ......... C04B 24/2641 |
| JP | H10-101392 A | 4/1998 | |
| WO | 2009156229 A2 | 12/2009 | |
| WO | WO-2017033590 A1 * | 3/2017 | ........... C04B 24/122 |

OTHER PUBLICATIONS

PCT, International Search Report for the corresponding patent application No. PCT/JP2020/013157, dated Jun. 16, 2020, with English translation.
Office Action for the corresponding patent application No. 202080027787.4, dated Oct. 10, 2022, with English translation.
Extended European Search Report for the corresponding European patent application No. 20788593.0, dated Dec. 5, 2022.
CNIPA, Office Action for the corresponding patent application No. 202080027787.4, dated Mar. 17, 2022, with English translation.
Office Action dated Jul. 20, 2023 for the corresponding Korean Patent Application No. 10-2021-7032476, with English translation.
Office Action for the corresponding Chinese patent application No. 202080027787.4, dated Apr. 4, 2023, with English translation.

\* cited by examiner

*Primary Examiner* — Marc S Zimmer
*Assistant Examiner* — Surbhi M Du
(74) *Attorney, Agent, or Firm* — LUCAS & MERCANTI, LLP

(57) ABSTRACT

Provided is an additive for concrete in which viscosity of a cement composition is low and fluidity is high at an initial stage of casting even when the additive is added, and long-term strength of concrete or the like improves by the addition. A cement additive comprising a water-absorbent resin, wherein the water-absorbent resin is formed by polymerizing a monomer mixture containing no less than 50 mol % of a nonionic non-crosslinkable monomer and no less than 0.1 mol % of a nonionic crosslinkable monomer, and a content of an anionic monomer in the monomer mixture is no more than 20 mol %.

11 Claims, No Drawings

CEMENT ADDITIVE, CEMENT ADMIXTURE, CEMENT COMPOSITION, MOLDED BODY, AND METHOD FOR IMPROVING STRENGTH OF MOLDED BODY

CROSS REFERENCE TO RELATED APPLICATION

This Application is a 371 of PCT/JP2020/013157 filed on Mar. 24, 2020 which, in turn, claimed the priority of Japanese Patent Application No. 2019-074148 filed on Apr. 9, 2019, both applications are incorporated herein by reference.

TECHNICAL FIELD

The present invention relates to a cement additive, a cement admixture, a cement composition, a molded body, and a method for improving strength of a molded body.

BACKGROUND ART

Cement is frequently used in civil engineering and construction sites, and cement compositions such as cement pastes obtained by adding water to cement, mortar obtained by mixing sand which is a fine aggregate with the cement paste, and concrete obtained by further mixing small stones are used for various purposes such as structural materials, bases, and fire resistant walls, and the use amount thereof is large. These cement compositions generate strength as a molded body through aggregation and curing by a hydration reaction between cement and water.

Cement additives are added to the cement composition for the purpose of improving various properties. As such an additive, a water-absorbent resin is known. For example, Patent Literature 1 discloses that a water-absorbent resin obtained by polymerizing a monomer component containing a sulfonic acid-based monomer is added to a cement composition. By adding such water-absorbent resin, the evaporation rate of water from the cement composition becomes slow at an initial stage of construction, and cracks do not occur.

Patent Literature 2 discloses a technique of using, as a cement additive, a water-absorbent resin obtained by coating the surface of a water-absorbent resin with a gradually soluble/hydrolyzable resin, when adding the water-absorbent resin to the cement composition, in view of the problem that it takes time to transport raw concrete before curing from a raw concrete production plant to a construction site, and thus a water-absorbent resin reaches a saturated water absorption amount during the transportation.

In addition, as the prior art related to the cement additive, there are Patent Literatures 3 to 5.

CITATION LIST

Patent Literature

Patent Literature 1: JP S63-291840 A
Patent Literature 2: JP H1-261250 A
Patent Literature 3: JP H09-002854 A
Patent Literature 4: JP H10-101392 A
Patent Literature 5: JP H10-1343 A

SUMMARY OF INVENTION

One of the most important characteristics in the performances of a molded body obtained by molding a cement composition is strength. The strength is broadly classified into early strength and long-term strength. The early strength indicates strength in which the curing period is mainly about several days. When early strength is high, it leads to shortening of the construction period and labor saving of construction.

On the other hand, the long-term strength indicates strength mainly after a curing period of 28 days, which is directly linked to durability of concrete and is a performance indispensable for a structure. For this reason, it is very important that the molded body obtained by molding the cement composition has high long-term strength.

Further, raw concrete before curing is transported from a raw concrete production plant to a construction site, pumped at a casting site, and filled in a mold. When the fluidity of the cement composition is too low or the viscosity of the cement composition is too high during pumping, problems occur for example it takes a long time to transport the cement composition, and the cement composition is stuck in a pipe in a severe case. Therefore, from the viewpoint of workability, the cement composition at the time of casting preferably has low viscosity and high fluidity.

An object of the present invention is to provide a cement additive which has low viscosity and high fluidity of the cement composition at an initial stage of addition for example at the time of casting and the like, and improves the long-term strength of a molded body such as concrete by addition.

The present invention is a cement additive including a water-absorbent resin, wherein the water-absorbent resin is formed by polymerizing a monomer mixture containing no less than 50 mol % of a nonionic non-crosslinkable monomer and no less than 0.1 mol % of a nonionic crosslinkable monomer, and a content of an anionic monomer in the monomer mixture is no more than 20 mol %.

DESCRIPTION OF EMBODIMENTS

<Cement Additive>

A first embodiment of the present invention is a cement additive including a water-absorbent resin, wherein the water-absorbent resin is formed by polymerizing a monomer mixture containing no less than 50 mol % of a nonionic non-crosslinkable monomer and no less than 0.1 mol % of a nonionic crosslinkable monomer, and a content of an anionic monomer in the monomer mixture is no more than 20 mol %.

According to the cement additive of the present embodiment, the viscosity of the cement composition at an initial stage hardly changes even by addition. For this reason, the cement composition is easily handled at the time of casting and is easily pumped, and workability improves. In addition, according to the cement additive of the present embodiment, the long-term strength of the molded body such as concrete after an elapse of a long-term curing period (for example, after 28 days) improves by addition.

By using the cement additive of the present embodiment, the long-term strength of the molded body remarkably improves while the fluidity of the cement composition at an initial stage is high, and the viscosity is low. Such an excellent effect is considered to be due to the fact that the water-absorbent resin of the present invention does not exhibit high water absorption performance immediately after addition of water (for example, up to about 2 hours), exhibits water absorption performance after an elapse of time, and exhibits high water absorption performance after an elapse of time.

In the water-absorbent resin used in the first embodiment, a content of an anionic monomer in the monomer mixture is no more than 20 mol %. When the content of the anionic monomer is more than 20 mol %, water absorption performance starts to appear at an initial stage, for example 5 minutes after addition of water (see Comparative Production Example 1 described later). However, when water is absorbed by the water-absorbent resin, the viscosity of the cement composition rapidly increases, and it is necessary to significantly increase the amount of dispersant to add in order to improve the fluidity of the cement composition (Comparative Examples 9 to 16 described later). On the other hand, when the content of the anionic monomer is no more than 20 mol % in the monomer mixture, and the content of the nonionic non-crosslinkable monomer is no less than 50 mol % and the content of the nonionic crosslinkable monomer is no less than 0.1 mol %, the water absorption performance at an initial stage, for example 5 minutes after addition of water, does not become very high. In addition, rapid water absorption performance is not exhibited even after 2 hours from addition (see Examples described later). For this reason, the amount of water absorbed by the water-absorbent resin in the cement composition is low, and the viscosity/fluidity of the cement composition at an initial stage of addition is maintained by adding a small amount of cement dispersant. Therefore, work efficiency of contractors improves, and pumping is smoothly performed. On the other hand, the present inventors have found that when the content of the anionic monomer is no more than 20 mol %, the content of the nonionic non-crosslinkable monomer is no less than 50 mol %, and the content of the nonionic crosslinkable monomer is no less than 0.1 mol % in the monomer mixture, the long-term strength of the molded body improves. The water-absorbent resin of the present embodiment gently exhibits water absorption performance, and thus gently absorbs surrounding water in a period from the time of casting to the curing period. This prevents loss of moisture from the molded body. In addition, because the cement exhibits strength by hydration reaction, if the water content is insufficient, a sufficient reaction is not performed, and the strength is not sufficiently exhibited as expected. It is considered that by the water-absorbent resin storing water after casting, water is supplied from the water-absorbent resin to remaining unhydrated matter during the curing period, and thus the hydration rate of the cement improves, and the strength of the concrete improves. The finding that high water absorption performance is exhibited even in a polymer having a small content of an anionic monomer is a very unexpected fact in view of the fact that it has been conventionally considered that water absorption performance is exhibited by repulsion of an anionic group in an anionic monomer constituting a water-absorbent resin. Detailed mechanism as to why the polymer whose main component is a nonionic monomer exhibits water absorption performance over time is unknown.

Hereinafter, the cement additive will be described in detail.

In the present specification, "X to Y" indicating a range means "no less than X and no more than Y".

In the present specification, "an acid (salt)" means "an acid and/or a salt thereof". "(Meth)acrylic" means "acrylic and/or methacrylic".

[Water-Absorbent Resin]

In the present specification, "water-absorbent resin" refers to a polymer gelling agent having a water-swellable property (CRC) defined by ERT 441.2-02 of no less than 5 g/g and a soluble component of no more than 50 mass %. "ERT" is an abbreviation for EDANA (European Disposables and Nonwovens Associations) Recommended Test Methods, which are a method of measuring water-absorbent resin of European standards (substantial global standards) established by EDANA. In the present specification, physical properties of the water-absorbent resin are measured in accordance with the 2002 version of ERT unless otherwise specified.

Water absorption ratio of the water-absorbent resin in the case of immersion in 50 mL of an aqueous solution having a pH of 12.9 at 25° C. for 2 hours is preferably less than 20 g/g, more preferably less than 18 g/g, and still more preferably less than 17.0 g/g. By having such characteristics, viscosity is low, fluidity is high, and workability is excellent at an initial stage of addition of the cement additive. The water absorption ratio in the case of immersion in an aqueous solution having a pH of 12.9 at 25° C. for 2 hours is preferably as low as possible. The lower limit of the absorption ratio is not particularly limited, and is usually no less than 5 g/g.

In the present specification, the aqueous solution having a pH of 12.9 is an aqueous solution obtained by mixing 1.72 g of $CaSO_4 \cdot 2H_2O$, 6.96 g of $Na_2SO_4$, 4.76 g of $K_2SO_4$, 7.12 g of KOH, and 979.4 g of deionized water. The aqueous solution having a pH of 12.9 is a cement simulated liquid that simulates strong alkali when containing cement. Therefore, with the aqueous solution, it is possible to simulate the behavior of the water-absorbent resin when water is added to the cement composition containing the cement additive.

The water absorption ratio of the water-absorbent resin in the case of immersion in an aqueous solution having a pH of 12.9 at 25° C. for 28 days is, for example, no less than 10 g/g, and from the viewpoint of improving the long-term strength, the water absorption ratio is preferably no less than 20 g/g, more preferably no less than 30 g/g or more, still more preferably no less than 31 g/g, and particularly preferably no less than 35 g/g. The water absorption ratio in the case of immersion in an aqueous solution having a pH of 12.9 at 25° C. for 28 days is preferably as high as possible. The upper limit thereof is not particularly limited, and is usually no more than 50 g/g, and preferably no more than 45 g/g.

The water-absorbent resin is preferably a powder, and the shape of the powder may be a spherical shape, an aggregate thereof, or an irregular shape (crushed shape) obtained by subjecting a hydrogel or a dry polymer to a pulverization step but is preferably an irregular shape (crushed shape).

For the particle size distribution of the water-absorbent resin (powder), no less than 90 mass % thereof is preferably in the range of 45 to 850 μm, more preferably in the range of 100 to 850 μm, still more preferably in the range of 250 to 850 μm, further still more preferably in the range of 250 to 700 μm, and further still more preferably in the range of 250 to 600 μm because the long-term strength further improves. It is considered that as the average particle size of the water-absorbent resin (powder) increases, the property of gradually releasing water is enhanced, and the long-term strength further improves. Having the average particle size of the water-absorbent resin (powder) of no more than the above-described upper limit is preferable from the viewpoint of freeze-thaw resistance.

The mass average particle size (D50) of the water-absorbent resin (powder) can be measured in the same manner as in "Average Particle Diameter and Distribution of Particle Diameter" disclosed in European Patent No. 0349240. That is, 10 g of particulate water absorbent is classified using JIS standard sieves (JIS Z8801-1(2000)) having mesh sizes of 850 μm, 710 μm, 600 μm, 500 μm, 420 μm, 300 μm, 212 μm, 150 μm, 106 μm, and 45 μm or sieves corresponding thereto, and the mass of the water-absorbent resin remaining on each sieve and the mass of the water-absorbent resin passed through all the sieves are measured. A particle size distribution is obtained by performing classification for 5 minutes with a vibration classifier (IIDA SIEVE SHAKER, TYPE: ES-65, SER.No. 0501) and plotting the residual percentage R on a logarithmic probability paper. Then, the particle size corresponding to R=50 mass % can be read as the mass average particle size (D50) and set as the average particle size.

The amount of the residual monomer in the water-absorbent resin is preferably no more than 1000 mass ppm, more preferably no more than 500 mass ppm, and still more preferably no more than 400 mass ppm. When the amount of the residual monomer is no more than the above-described upper limit, safety is high when the monomer is added to the cement composition. The amount of the residual monomer is preferably as small as possible but is usually no less than 5 mass ppm.

As a method for reducing the amount of the residual monomer, a conventionally known method can be used, and for example, a method such as a method of adding a reducing substance after polymerization can be used. Here, the amount of the residual monomer means the amount of monomer remaining in the water-absorbent resin. Examples of the reducing substance include inorganic reducing agents such as phosphorus-based reducing agents, and sulfur-based reducing agents (particularly oxygen-containing sulfur-based reducing agents), and organic reducing agents such as ascorbic acid and the like.

As the amount of the residual monomer, a value measured by, in accordance with ERT410.2-02, adding 1.0 g of the water-absorbent resin to 200 ml of a 0.9 wt % sodium chloride aqueous solution, stirring the mixture at 500 rpm for 1 hour, and determining the amount of the dissolved monomer (unit; mass ppm) using HPLC (high performance liquid chromatography) is adopted.

The water-absorbent resin is formed by polymerizing a monomer mixture containing no less than 50 mol % of a nonionic non-crosslinkable monomer and no less than 0.1 mol % of a nonionic crosslinkable monomer. The monomer mixture refers to the entire polymerizable monomer that forms a polymer as a main component of the water-absorbent resin, and the total amount of monomers that form the polymer is 100 mol %. The monomer mixture contains at least a nonionic non-crosslinkable monomer and a nonionic crosslinkable monomer. In addition, both the nonionic non-crosslinkable monomer and the nonionic crosslinkable monomer are polymerizable monomers (monomers having an unsaturated double bond). The nonionic crosslinkable monomer is, for example, a monomer having two or more unsaturated double bonds and playing a role of crosslinking main chains.

In the monomer mixture, a content of an anionic monomer is no more than 20 mol %.

In other words, the water-absorbent resin includes no less than 50 mol % of a constitutional unit derived from the nonionic non-crosslinkable monomer and no less than 0.1 mol % of a constitutional unit derived from the nonionic crosslinkable monomer, and includes no more than 20 mol % of a constitutional unit derived from the anionic monomer. The constitutional unit derived from the nonionic non-crosslinkable monomer, the constitutional unit derived from the nonionic crosslinkable monomer, and the constitutional unit derived from the anionic monomer may be considered to coincide with the molar ratio of each monomer at the time of preparation for production. That is, another embodiment is a cement additive including a water-absorbent resin, wherein the water-absorbent resin has no less than 50 mol % of a constitutional unit derived from a nonionic non-crosslinkable monomer and no less than 0.1 mol % of a constitutional unit derived from a nonionic crosslinkable monomer, and a constitutional unit derived from an anionic monomer is no more than 20 mol %.

A preferred embodiment of the present invention is a cement additive including a water-absorbent resin, wherein the water-absorbent resin is obtained by polymerizing a monomer mixture containing no less than 50 mass % of a nonionic non-crosslinkable monomer and no less than 0.1 mass % of a nonionic crosslinkable monomer, and a content of an anionic monomer in the monomer mixture is no more than 20 mass %.

(Nonionic Non-Crosslinkable Monomer)

The nonionic non-crosslinkable monomer is a main component of a monomer component constituting the water-absorbent resin. The nonionic non-crosslinkable monomer refers to a monomer having one unsaturated double bond in the monomer.

The nonionic non-crosslinkable monomer is preferably water-soluble because it can further exhibit the effect of the present invention. Hereinafter, the nonionic non-crosslinkable monomer that is water-soluble is also referred to as a water-soluble nonionic non-crosslinkable monomer. Here, "water-soluble" in the water-soluble nonionic non-crosslinkable monomer means that no less than 5 g of the monomer is dissolved in 100 g of water at 25° C. The water-soluble nonionic non-crosslinkable monomer is dissolved in an amount of preferably no less than 10 g, more preferably no less than 50 g, further preferably no less than 100 g in 100 g of water at 25° C.

The nonionic non-crosslinkable monomer is not particularly limited as long as it has one unsaturated double bond in the monomer. The nonionic non-crosslinkable monomer suitably excludes N-vinylacylamides. Specific examples of the nonionic non-crosslinkable monomer include (meth) acrylamide-based monomers such as (meth)acrylamide, N-monomethyl (meth) acrylamide, N-monoethyl (meth) acrylamide, N,N-hydroxymethyl (meth)acrylamide, and N,N-dimethyl (meth)acrylamide; N-vinyl lactam-based monomers such as N-vinylpyrrolidone; hydroxy (meth)acrylates such as hydroxyethyl (meth) acrylate, hydroxypropyl (meth)acrylate, hydroxybutyl (meth)acrylate, and hydroxypentyl (meth)acrylate; unsaturated amines such as N-(2-dimethylaminoethyl) (meth) acrylamide, vinylpyridine, and vinylimidazole; vinyl cyanide-based monomers such as acrylonitrile and methacrylonitrile; unsaturated polyalkylene glycol alkenyl ether-based monomer represented by the following general formula (1);

[Chemical Formula 1]

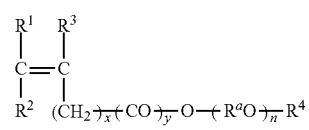

(1)

(in the general formula (1), $R^1$, $R^2$, and $R^3$ independently represent a hydrogen atom or a methyl group, $R^4$ represents a hydrogen atom or a hydrocarbon group having 1 to 30 carbon atoms, $R^aO$, the same or different, represents an oxyalkylene group having 2 to 18 carbon atoms, n represents an average number of moles of the added oxyalkylene group represented by $R^aO$, n is a number of 1 to 500, x is an integer of 0 to 2, and y is 0 or 1), and the like. They can be used singly, or in a mixture of two or more kinds thereof.

In the general formula (1), $R^4$ represents a hydrogen atom or a hydrocarbon group having 1 to 30 carbon atoms. Here, examples of the hydrocarbon group having 1 to 30 carbon atoms include an alkyl group having 1 to 30 carbon atoms (aliphatic alkyl group or alicyclic alkyl group), an alkenyl group having 1 to 30 carbon atoms, an alkynyl group having 1 to 30 carbon atoms, an aromatic group having 6 to 30 carbon atoms, and the like. Among them, the hydrocarbon group is preferably an alkyl group, and more preferably an aliphatic alkyl group. From the viewpoint that the effect of the present invention can be further exhibited, $R^4$ is preferably a hydrogen atom or a hydrocarbon group having 1 to 20 carbon atoms, more preferably a hydrogen atom or a hydrocarbon group having 1 to 12 carbon atoms, further preferably a hydrogen atom or a hydrocarbon group having 1 to 10 carbon atoms, and particularly preferably a hydrogen atom or an alkyl group having 1 to carbon atoms. In the general formula (1), n is a number of 1 to 500, preferably 10 to 300, and more preferably 10 to 100. RaO, the same or different, represents an oxyalkylene group having 2 to 18 carbon atoms, preferably an oxyalkylene group having 2 to 8 carbon atoms, and more preferably an oxyalkylene group having 2 to 4 carbon atoms. The addition form of RaO may be any form of random addition, block addition, alternate addition, and the like. In order to ensure the balance between hydrophilicity and hydrophobicity, it is preferable that an oxyethylene group be contained in the oxyalkylene group as an essential component, it is more preferable that no less than 50 mol % of the entire oxyalkylene group be an oxyethylene group, it is further preferable that no less than 90 mol % of the entire oxyalkylene group be an oxyethylene group, and it is particularly preferable that 100 mol % of the entire oxyalkylene group be an oxyethylene group. The unsaturated polyalkylene glycol alkenyl ether-based monomer represented by the general formula (1) can be produced by a conventionally known method.

Further, because of excellent water absorption performance after a long time elapses, the nonionic non-crosslinkable monomer may be hydrolyzed in the case of immersion in an aqueous solution having a pH of 12.9 at 25° C. for 24 hours. Since the nonionic non-crosslinkable monomer undergoes hydrolysis under strong alkaline conditions after an elapse of 24 hours, it tends to have a property such as exhibiting water absorption performance after an elapse of time (for example, after hours). Here, the fact that the nonionic non-crosslinkable monomer is hydrolyzed in the case of immersion in an aqueous solution having a pH of 12.9 at 25° C. for 24 hours can be confirmed by a measurement result by liquid chromatography (LC) of the aqueous solution. Examples of the nonionic non-crosslinkable monomer that undergoes such hydrolysis include hydroxy (meth) acrylates such as hydroxyethyl (meth)acrylate, hydroxypropyl (meth) acrylate, hydroxybutyl (meth)acrylate, and hydroxypentyl (meth)acrylate and the like.

In addition, because water absorption performance is suppressed at an initial stage, it is preferable that the nonionic non-crosslinkable monomer be not hydrolyzed in the case of immersion in an aqueous solution having a pH of 12.9 at 25° C. for 2 hours. Here, "not hydrolyzed" means that the hydrolyzed ratio (hydrolysis rate) is no more than 5 mass %. Because the nonionic non-crosslinkable monomer maintains the structure by not causing hydrolysis in 2 hours, it is difficult to exhibit water absorbability at an initial stage. Examples of the nonionic non-crosslinkable monomer that is not hydrolyzed at an initial stage include acrylamide, N,N-hydroxymethyl (meth)acrylamide, and the like.

In addition, because of excellent water absorption performance after an elapse of time, the nonionic non-crosslinkable monomer preferably contains at least one selected from the group consisting of a (meth)acrylamide-based monomer, a hydroxy(meth)acrylate, and an unsaturated polyalkylene glycol alkenyl ether-based monomer represented by the general formula (1), more preferably contains a (meth) acrylamide-based monomer, still more preferably contains (meth)acrylamide, and particularly preferably contains acrylamide. Further, the nonionic non-crosslinkable monomer may be only (meth)acrylamide or only acrylamide. In another preferred embodiment, the nonionic non-crosslinkable monomer is in a form in which a (meth)acrylamide-based monomer and an unsaturated polyalkylene glycol alkenyl ether-based monomer represented by the general formula (1) are used in combination.

In the monomer mixture, the content of the nonionic non-crosslinkable monomer is no less than 50 mol %. When the content of the nonionic non-crosslinkable monomer is no less than 50 mol %, the viscosity/fluidity of the cement composition at an initial stage hardly change by addition. The content of the nonionic non-crosslinkable monomer in the monomer mixture is, in the preferred order, no less than 75 mol %, no less than 80 mol %, no less than 85 mol %, no less than 90 mol %, no less than 93 mol %, no less than 95 mol %, no less than 97 mol %, no less than 98 mol %, and no less than 99 mol % because water absorption performance is suppressed at an initial stage. The upper limit of the content of the nonionic non-crosslinkable monomer in the monomer mixture is preferably no more than 99.9 mol %, and more preferably no more than 99.85 mol %, from the viewpoint of securing the water absorption performance. As the content of each monomer in the monomer mixture, a value obtained up to the second decimal place is adopted.

(Nonionic Crosslinkable Monomer)

The nonionic crosslinkable monomer is a monomer having two or more polymerizable unsaturated groups. A crosslinked structure (crosslinked body) is formed by the nonionic crosslinkable monomer, and the water absorption performance improves.

The nonionic crosslinkable monomer is preferably water-soluble because it can further exhibit the effect of the present invention. Hereinafter, the nonionic crosslinkable monomer that is water-soluble is also referred to as a water-soluble nonionic crosslinkable monomer. Here, "water-soluble" in the water-soluble nonionic crosslinkable monomer refers to a monomer that dissolves in an amount of no less than 5 g in 100 g of water at 25° C. The water-soluble nonionic crosslinkable monomer is preferably dissolved in an amount of no less than 10 g, more preferably no less than 50 g, and further preferably no less than 100 g in 100 g of water at 25° C.

The nonionic crosslinkable monomer is not particularly limited, but is preferably a compound having two or more polymerizable unsaturated groups. Examples thereof include (meth)acrylamide-based monomers such as N,N'-methylenebis (meth)acrylamide; polyfunctional (meth)acrylates such as (poly)ethyleneglycoldi (meth)acrylate such as diethyleneglycoldiacrylate, (poly) propyleneglycoldi (meth) acrylate, trimethylolpropanetri(meth)acrylate, ethylene oxide-modified trimethylolpropanetri(meth)acrylate, and pentaerythritolhexa(meth)acrylate; allyl esters of cyanuric acid or isocyanuric acid such as triallyl cyanurate and triallyl isocyanurate; and the like. They can be used singly, or in a mixture of two or more kinds thereof.

Among them, the nonionic crosslinkable monomer is (meth)acrylamide-based monomer, allyl ester of cyanuric acid or isocyanuric acid and polyfunctional (meth)acrylate, a suitable nonionic non-crosslinkable monomer is a (meth)acrylamide-based monomer, and because long-term strength also improves, the nonionic crosslinkable monomer also preferably contains a (meth)acrylamide-based monomer, more preferably contains N,N'-methylenebis (meth)acrylamide, and still more preferably contains N,N'-methylenebisacrylamide. Further, the nonionic crosslinkable monomer may be only a (meth)acrylamide-based monomer, only N,N'-methylenebis (meth)acrylamide, or only N,N'-methylenebisacrylamide.

The content of the nonionic crosslinkable monomer in the monomer mixture is no less than 0.1 mol %. When the content of the nonionic crosslinkable monomer is no less than 0.1 mol %, the effect of the present invention is exhibited. Because the effect of the present invention that the viscosity of the cement composition at an initial stage of addition is low and long-term strength is excellent is further exhibited, the content of the nonionic crosslinkable monomer in the monomer mixture is, in the preferred order, no less than 0.15 mol %, no less than 0.2 mol %, and no less than 0.5 mol %. From the viewpoint that the viscosity of the cement composition at an initial stage of addition is low, the content of the nonionic crosslinkable monomer in the monomer mixture may be no less than 0.8 mol %, or may be no less than 1.0 mol %. It is considered that by having a high-density crosslinked structure, the water retained by the water-absorbent resin can be gradually released into the cement composition, and the long-term strength improves. In addition, the content of the nonionic crosslinkable monomer in the monomer mixture is preferably no more than 8.0 mol %, more preferably no more than 5.0 mol %, and further preferably no more than 3.0 mol %, from the viewpoint of water absorption performance.

The entire amount of the nonionic crosslinkable monomer may be added to the nonionic non-crosslinkable monomer aqueous solution after preparation before polymerization step, or a part thereof may be added after the initiation of polymerization.

(Anionic Monomer)

The anionic monomer refers to a monomer having an anionic functional group or a salt group thereof in the monomer. The anionic functional group means a functional group in which a counter ion is dissociated to become an anion (anionized).

Examples of the anionic functional group or a salt group thereof include a sulfonic acid (salt) group, a sulfuric acid (salt) group, a phosphoric acid (salt) group, a phosphonic acid (salt) group, a carboxylic acid (salt) group (carboxyl group or a salt group thereof), and the like.

Examples of the anionic monomer include anionic unsaturated monomers such as (meth)acrylic acid, maleic acid (maleic anhydride), itaconic acid, cinnamic acid, vinylsulfonic acid, allyltoluenesulfonic acid, vinyltoluenesulfonic acid, styrenesulfonic acid, methallylsulfonic acid, sodium 2-sulfoethyl methacrylate, 2-hydroxy-3-allyloxypropanesulfonic acid, isoprenesulfonic acid, 2-(meth)acrylamide-2-methylpropanesulfonic acid, 2-(meth)acryloyl ethanesulfonic acid, 2-(meth)acryloylpropanesulfonic acid, 2-hydroxyethyl(meth)acryloyl phosphate, mono(2-hydroxyethyl) methacrylate phosphate, mono(2-hydroxyethyl) acrylate phosphate, polyalkyleneglycol mono(meth)acrylate acid phosphoric acid ester, and the like, and salts thereof.

The content of the anionic monomer in the monomer mixture is no more than 20 mol %. When the content of the anionic monomer in the monomer mixture exceeds 20 mol %, water absorption by the water-absorbent resin occurs at an initial stage, for example 5 minutes after addition of water, and the viscosity of the cement composition rapidly increases. From the viewpoint of securing fluidity and viscosity at an initial stage, the content of the anionic monomer in the monomer mixture is, in the preferred order, less than 10 mol %, no more than 5 mol %, no more than 4 mol %, no more than 3 mol %, no more than 2 mol %, and no more than 1 mol %, and is most preferably 0 mol % (that is, not containing an anionic monomer).

In the present embodiment, a cationic monomer may be contained in addition to the nonionic monomer and the anionic monomer. The cationic monomer refers to a monomer having a cationic functional group or a salt group thereof in the monomer. The cationic functional group means a functional group in which a counter ion is dissociated to become a cation (cationized).

Examples of the cationic monomer include quaternized N-vinylimidazole, quaternized N-allylimidazole, quaternized 4-vinylpyridine, quaternized 1-[2-(acryloyloxy)ethyl]-1H-imidazole, 1-[2-(methacryloyloxy)ethyl]-1H-imidazole, and salts thereof.

In the present embodiment, the content of the cationic monomer in the monomer mixture is preferably no more than 20 mol %, and is, in the preferred order, less than 10 mol %, no more than 5 mol %, no more than 4 mol %, no more than 3 mol %, no more than 2 mol %, no more than 1 mol %, and is most preferably 0 mol % (that is, not containing a cationic monomer).

A preferred embodiment of the present invention is an embodiment in which the water-absorbent resin does not contain an ionic monomer (an anionic monomer and a cationic monomer), that is, the water-absorbent resin is obtained by polymerizing a nonionic non-crosslinkable monomer and a nonionic crosslinkable monomer.

(Method for Producing Water-Absorbent Resin)

The method for producing the water-absorbent resin is not particularly limited, and the water-absorbent resin can be produced by a conventionally known method. Examples of the polymerization method for obtaining the water-absorbent resin include spray polymerization, droplet polymerization, bulk polymerization, precipitation polymerization, aqueous solution polymerization, reversed phase suspension polymerization, and the like. Here, as an example, a production method using aqueous solution polymerization is described.

(1) Preparation Step of Monomer Mixture Aqueous Solution

This step is a step of preparing a monomer mixture aqueous solution by dissolving each monomer constituting a polymer in water as a solvent.

The monomers may be added collectively or sequentially. Here, the aqueous solution is a concept including an aqueous dispersion. The monomer mixture aqueous solution may contain a component constituting a cement additive such as a trace component (chelating agent, surfactant, dispersant, and the like) and the like as necessary.

In the "aqueous solution" in the monomer mixture aqueous solution, 100 mass % of the solvent is not limited to water, and 0 to 30 mass o, preferably 0 to 5 mass % of a water-soluble organic solvent (for example, alcohol and the like) may be used in combination, and these are treated as an aqueous solution in the present invention.

(2) Aqueous Solution Polymerization Step

Aqueous solution polymerization is a method of polymerizing a monomer aqueous solution without using a dispersion solvent, and is disclosed in, for example, U.S. Pat. Nos. 4,625,001, 4,873,299, 4,286,082, 4,973,632, 4,985,518, 5,124,416, 5,250,640, 5,264,495, 5,145,906, 5,380,808, European Patent Nos. 0811636, 0955086, 0922717, and the like.

The concentration of the monomer aqueous solution at the polymerization is not particularly limited and is preferably no less than 20 mass % and no more than a saturated concentration, more preferably 25 to 80 mass %, and further preferably 30 to 70 mass %. When the concentration is no less than 20 mass %, a decrease in productivity can be suppressed. Polymerization in a slurry of monomers (aqueous dispersion) is preferably performed at a concentration of no more than a saturated concentration because physical properties deteriorate.

In the polymerization step, a polymerization initiator is added to the monomer mixture aqueous solution obtained as described above.

The polymerization initiator to be used is appropriately determined depending on the polymerization form, and is not particularly limited, and examples thereof include a photolytic polymerization initiator, a thermal decomposition polymerization initiator, a redox polymerization initiator, and the like. Polymerization is initiated by these polymerization initiators.

Examples of the photolytic polymerization initiator include benzoin derivatives, benzyl derivatives, acetophenone derivatives, benzophenone derivatives, azo compounds, and the like. Specifically, the examples include benzoin, benzoin methyl ether, benzoin ethyl ether, benzoin isopropyl ether, α-methylbenzoin, α-phenylbenzoin, anthraquinone, methylanthraquinone, acetophenone, 2,2-diethoxyacetophenone, 2,2-dimethoxy-2-phenylacetone, benzyldiacetylacetophenone, benzophenone, p-chlorobenzophenone, 2-hydroxy-2-methylpropiophenone, diphenyl disulfide, tetramethylthiuram sulfide, α-chloromethylnaphthalene, anthracene, hexachlorobutadiene, pentachlorobutadiene, Michler's ketone, 2-chlorothioxanthone, 2,4-diethylthioxanthone, benzyldimethylketal, bis(2,4,6-trimethylbenzoyl)-phenylphosphine oxide, 2-methyl-1-[4-(methylthio)phenyl]-2-morpholinopropanone-1,2-hydroxy-2-methyl-1-phenylpropan-1-one, 1-[4-(2-hydroxyethoxy)-phenyl]-2-hydroxy-2-methyl-1-propan-1-one, and the like. Such a photolytic polymerization initiator may be a commercially available product, and examples thereof include product names Irgacure (registered trademark) 184 (hydroxycyclohexyl-phenyl ketone) and Irgacure (registered trademark) 2959 (1-[4-(2-hydroxyethoxy)-phenyl]-2-hydroxy-2-methyl-1-propan-1-one) and the like, which are manufactured by Ciba Specialty Chemicals Inc.

Examples of the thermal decomposition polymerization initiator include persulfates such as sodium persulfate, potassium persulfate, and ammonium persulfate; peroxides such as hydrogen peroxide, t-butyl peroxide, and methyl ethyl ketone peroxide; azo compounds such as 2,2'-azobis(2-amidinopropane)dihydrochloride and 2,2'-azobis[2-(2-imidazolin-2-yl)propane]dihydrochloride; and the like.

Furthermore, examples of the redox polymerization initiator include a system in which a reducing compound such as L-ascorbic acid, sodium bisulfite, and the like is used in combination with the persulfate or peroxide.

The photolytic polymerization initiator and the thermal decomposition polymerization initiator may be used in combination. Further, an active energy ray such as ultraviolet ray, electron beam, and γ-ray may be used singly or in combination with the polymerization initiator.

The used amount of the polymerization initiator is preferably 0.0001 to 1 mol % and more preferably 0.0005 to 0.5 mol % with respect to the monomer.

The polymerization step can be performed at normal pressure, at reduced pressure, or under pressure, but is preferably performed at normal pressure (or the vicinity thereof, usually ±10 mmHg). The temperature at the start of polymerization is preferably 15 to 130° C., more preferably 20 to 120° C. although it depends on the type of polymerization initiator used.

In this way, a gel-like crosslinked polymer is obtained.

(3) Gel-Crushing Step

This step is an optional step of gel-crushing the gel-like crosslinked polymer (hereinafter, referred to as "hydrogel") obtained through the polymerization step and the like (in particular, aqueous solution polymerization) to obtain a hydrogel in a particulate form (hereinafter, referred to as "particulated hydrogel").

The gel-crusher that can be used is not particularly limited, and examples thereof include a gel-crusher including a plurality of rotary stirring blades such as a batch-type or continuous double-arm kneader, a single-screw extruder, a twin-screw extruder, a meat chopper, and the like. Among them, a screw type extruder having a porous plate at the tip is preferable, and examples thereof include a screw type extruder disclosed in JP 2000-063527 A.

(4) Drying Step

This step is a step of drying the hydrogel obtained through the polymerization step and the like to obtain a dry polymer. When the polymerization step is aqueous solution polymerization, gel crush (grain refining) is performed before and/or after drying the hydrogel. The dry polymer (aggregate) obtained in the drying step may be supplied to the pulverization step as it is.

The drying method is not particularly limited, and various methods can be adopted. Specific examples thereof include heat drying, hot air drying, reduced pressure drying, infrared drying, microwave drying, azeotropic dehydration drying in a hydrophobic organic solvent, high humidity drying using high temperature water vapor, and the like, and one or two of these can be used in combination. The drying temperature is preferably 100 to 300° C., more preferably 120 to 250° C. In addition, the drying time depends on the surface area and water content of the hydrogel, the type of dryer, and the like, but is preferably, for example, 1 minute to 5 hours.

(5) Pulverization/Classification Step

This step is a step of pulverizing and/or classifying the dried polymer obtained in the drying step to obtain a water-absorbent resin preferably having a specific particle size. The step is different from the step (3) gel-crushing step in that the object to be pulverized has gone through a drying step. In addition, the water-absorbent resin after the pulverization step may be referred to as a pulverized product.

The control of the particle size can be performed in the polymerization step, the gel-crushing step or in the pulverization/classification step of the drying step, and is particularly preferably performed in the classification step after drying.

[Other Components]

The cement additive contains a water-absorbent resin as a main component. Here, the main component means that the water-absorbent resin takes up no less than 80 mass %, preferably no less than 90 mass %, more preferably no less than 95 mass %, and most preferably no less than 98 mass % of the cement additive (the upper limit is 100 mass %, that is, an cement additive consisting of a water-absorbent resin). The water-absorbent resin referred to in the present invention also includes a water-absorbent resin obtained by subjecting the obtained polymer to some chemical modification (surface modification or the like). Preferably, the water-absorbent resin is a water-absorbent resin consisting of a polymer obtained by polymerizing the monomer mixture.

The cement additive may contain, in addition to the water-absorbent resin, a surfactant, a coloring inhibitor, a reducing agent, and the like in an amount of 0 to 10 mass % and preferably 0.1 to 1 mass %, respectively, for the purpose of stabilizing the water-absorbent resin and the like.

<Cement Admixture>

A second embodiment of the present invention is a cement admixture including the cement additive of the first embodiment and a cement dispersant. By using both in combination, when they are added in the cement composition, the dispersibility of the cement is secured and the viscosity of the cement composition is maintained low even in a region where the amount of the cement dispersant added is small, and the long-term strength of the molded body improves.

As the cement dispersant, a conventionally known cement dispersant can be used. Examples of the cement dispersant include polyalkylarylsulfonic acid salt-based dispersants such as naphthalenesulfonic acid formaldehyde condensate; melamine formalin resin sulfonic acid salt-based dispersants such as melamine sulfonic acid formaldehyde condensate; aromatic aminosulfonic acid salt-based dispersants such as aminoarylsulfonic acid-phenol-formaldehyde condensate; lignin sulfonic acid-based dispersants such as lignin sulfonate salt and modified lignin sulfonate salt; various sulfonic acid-based dispersants having sulfonic acid groups in the molecule such as polystyrene sulfonic acid salt-based dispersant; copolymers obtained from polyalkylene glycol mono (meth)acrylic acid ester-based monomers, (meth) acrylic acid-based monomers, and monomers copolymerizable with these monomers as described in JP S59-18338 A and JP H7-223852 A; various polycarboxylic acid-based dispersants having a (poly)oxyalkylene group and a carboxyl group in a molecule such as a copolymer obtained from unsaturated (poly)alkylene glycol ether-based monomer, a maleic acid-based monomer, or (meth)acrylic acid-based monomer as described in JP H10-236858 A, JP 2001-220417 A, JP 2002-121055 A, JP 2002-121056 A, and JP 2018-111622 A; various phosphoric acid-based dispersants having a (poly) oxyalkylene group and a phosphoric acid group in a molecule such as a copolymer obtained from (alkoxy)polyalkylene glycol mono (meth)acrylate, a phosphoric acid monoester-based monomer, and a phosphoric acid diester-based monomer as described in JP 2006-52381A, a phosphoric acid-based dispersant described in JP 2008-517080 A, and the like. Among them, as the cement dispersant, a polycarboxylic acid-based dispersant is preferably used because the effect of the present invention is further exhibited. The cement dispersant may be used singly, or in combination of two or more kinds thereof.

The content mass ratio of the cement dispersant and the cement additive in the cement admixture is preferably 1:0.1 to 10, and more preferably 1:0.5 to 5.

<Cement Composition>

A third embodiment of the present invention is a cement composition including the cement additive of the first embodiment and cement.

Another embodiment of the present invention is a cement composition including a water-absorbent resin and cement, wherein the water-absorbent resin is formed by polymerizing a monomer mixture containing no less than 50 mol % of a nonionic non-crosslinkable monomer and no less than 0.1 mol % of a nonionic crosslinkable monomer, and a content of an anionic monomer in the monomer mixture is no more than 20 mol %.

As the content ratio of the cement additive (or water-absorbent resin) in the cement composition, any appropriate content ratio can be adopted depending on the purpose. As the content ratio, when used in mortar, concrete or the like using hydraulic cement, the content ratio of the cement additive (or water-absorbent resin) per 100 parts by mass of cement is preferably 0.01 to 10 parts by mass, more preferably 0.02 to 5 parts by mass, and still more preferably 0.05 to 3 parts by mass. By having such a content ratio, various preferable effects such as low viscosity, high fluidity, and increase in strength are brought.

The cement composition preferably contains water. The cement composition preferably contains an aggregate.

Any suitable cement may be employed as the cement. Examples of such cement include Portland cement (normal, fast, ultra fast, medium heat, sulphate resistant and low alkali forms of them), various mixed cements (blast furnace cement, silica cement, fly ash cement), white Portland cement, alumina cement, ultra rapid hardening cements (clinker type 1 rapid hardening cement, clinker type 2 rapid hardening cement, magnesium phosphate cement), cement for grouting, well cement, low-heat cement (low heat generation type blast furnace cement, fly ash mixed low heat generation type blast furnace cement, high belite content cement), ultra-high strength cement, cement-based solidification material, ecocement (cement produced from one or more types of incinerated ash of municipal waste and incinerated ash of sewage sludge as raw materials), and the like. Furthermore, the cement composition may contain a fine powder such as blast furnace slag, fly ash, cinder ash, clinker ash, husk ash, silica powder, limestone powder, and the like, or gypsum. The cement contained in the cement composition of the present invention may be one kind or two or more kinds.

In the cement composition, any appropriate value can be set as a unit water amount per $m^3$, a cement usage, and a water/cement ratio. As the values, preferably, the unit water amount is 100 $kg/m^3$ to 185 $kg/m^3$, the used cement amount is 250 $kg/m^3$ to 800 $kg/m^3$, and the water/cement ratio (mass ratio)=0.1 to 0.7, more preferably, the unit water amount is 120 $kg/m^3$ to 180 $kg/m^3$, the used cement amount is 270 $kg/m^3$ to 800 $kg/m^3$, and the water/cement ratio (mass ratio)=0.12 to 0.65.

As the aggregate, any appropriate aggregate such as fine aggregate (sand or the like) or coarse aggregate (crushed stone or the like) may be adopted. Examples of such an aggregate include sand (land sand and the like), crushed stone, water-crushed slag, and recycled aggregate. Examples of such an aggregate also include fire resistant aggregates such as silica stone, clay, zircon, high alumina, silicon carbide, graphite, chromium, chrome-magnesia, and magnesia.

The cement composition preferably includes a cement dispersant. That is, a preferred embodiment of the present invention is a cement composition including the cement additive of the first embodiment, cement, and a cement dispersant. The cement dispersant is the same as that described in the section of the second embodiment.

The content mass ratio of the cement dispersant and the cement additive in the cement composition is preferably 1:0.1 to 10, and more preferably 1:0.5 to 5. The content ratio of the cement dispersant in the cement composition may be any appropriate content ratio depending on the purpose, and is, for example, 0.01 to 10 parts by mass per 100 parts by mass of cement.

The cement composition may contain any suitable other cement additives as long as the effects of the present invention are not impaired. Examples of such other cement additives include other cement additives as exemplified in the following (1) to (12). (1) Water-soluble polymer substance: nonionic cellulose ethers such as methyl cellulose, ethyl cellulose, and carboxymethyl cellulose; polysaccharides produced by microbial fermentation such as yeast glucan, xanthan gum, and β-1,3 glucans; polyacrylamide, and the like. (2) Polymer emulsion: copolymers of various vinyl monomers such as alkyl (meth)acrylate, and the like. (3) Curing retarder: oxycarboxylic acids such as gluconic acid, glucoheptonic acid, arabonic acid, malic acid, and citric acid, and salts thereof; monosaccharides such as glucose, fructose, galactose, mannose, xylose, arabinose, ribose, and isomerized sugars; disaccharides such as maltose, sucrose, and lactose; trisaccharides such as raffinose; oligosaccharides such as dextrin; sugars or sugar alcohols such as erythritol, xylitol, D-arabinitol, L-arabinitol, ribitol, volemitol, perseitol, sorbitol, mannitol, galactitol, D-traytol, L-traytol, D-iditol, D-glycidol, D-erythro-D-galacto-octitol; polyhydric alcohols such as glycerin; phosphonic acids such as aminotri(methylene phosphonic acid) and derivatives thereof, and the like. (4) Early-potentiating agent/accelerator: soluble calcium salts such as calcium chloride, calcium nitrite, calcium nitrate, calcium bromide, and calcium iodide; chlorides such as iron chloride and magnesium chloride; sulphate; potassium hydroxide; sodium hydroxide; carbonate; thiosulfate; formate salts such as formic acid and calcium formate; alkanolamine; alumina cement; calcium aluminate silicate, and the like. (5) Oxyalkylene-based antifoaming agent: polyoxyalkylene alkyl ethers such as diethylene glycol heptyl ether; polyoxyalkylene acetylene ethers; (poly)oxyalkylene fatty acid esters; polyoxyalkylene sorbitan fatty acid esters; polyoxyalkylene alkyl(aryl)ether sulfuric acid ester salts; polyoxyalkylene alkyl phosphate esters; polyoxyalkylene alkylamines such as polyoxypropylene polyoxyethylene laurylamine (added with 1 to 20 moles of propylene oxide, added with 1 to 20 moles of ethylene oxide, etc.) and an amine derived from a fatty acid obtained from cured beef tallow to which an alkylene oxide is added (added with 1 to 20 moles of propylene oxide, added with 1 to 20 moles of ethylene oxide, etc.); polyoxyalkylene amide, and the like. (6) Antifoaming agent other than oxyalkylene-based antifoaming agent: mineral oil-based antifoaming agent, fat and oil-based antifoaming agent, fatty acid-based antifoaming agent, fatty acid ester-based antifoaming agent, alcohol-based antifoaming agent, amide-based antifoaming agent, phosphoric acid ester-based antifoaming agent, metal soap-based antifoaming agent, silicone-based antifoaming agent, and the like. (7) AE agent: resin soap, saturated or unsaturated fatty acid, sodium hydroxystearate, lauryl sulfate, ABS (alkylbenzene sulfonic acid), alkane sulfonate, polyoxyethylene alkyl (phenyl) ether, polyoxyethylene alkyl (phenyl) ether sulfuric acid ester or a salt thereof, polyoxyethylene alkyl (phenyl) ether phosphoric acid ester or a salt thereof, protein material, alkenyl sulfosuccinic acid, α-olefin sulfonate, and the like. (8) Other surfactants: various anionic surfactants; various cationic surfactants such as alkyltrimethylammonium chloride; various nonionic surfactants; various amphoteric surfactants, and the like. (9) Waterproofing agent: fatty acid (salt), fatty acid ester, fat and oil, silicon, paraffin, asphalt, wax, and the like. (10) Anti-rust agent: nitrite, phosphate, zinc oxide, and the like. (11) Crack reducing agent: polyoxyalkyl ether and the like. (12) Expansion material; ettringite-based expansion material, coal-based expansion material, and the like.

Examples of other known cement additives include a cement moisturizer, a thickener, a separation reducing agent, a flocculant, a dry shrinkage reducing agent, a strength enhancing agent, a self-leveling agent, an anti-rust agent, a colorant, and an antifungal agent, and the like. These known cement additives (materials) may be used singly or in combination of two or more kinds thereof. Other cement additives are blended in an appropriate amount in the cement composition in consideration of the purpose of addition.

The cement composition may be effective for ready mixed concrete, concrete for concrete secondary products, concrete for centrifugal molding, concrete for vibration compaction, steam-cured concrete, sprayed concrete, and the like. The cement composition may also be effective for mortar and concrete that are required to have high fluidity, such as medium-flow concrete (concrete having a slump value of 22 to 25 cm), high-flow concrete (concrete having a slump-value of no less than 25 cm and a slump-flow value of 50 to 70 cm), self-filling concrete, and self-leveling material, and the like.

The cement composition may be prepared by blending structural components by any appropriate method. Examples of the method include a method of kneading structural components in a mixer, and the like.

<Aggregate Composition>

A fourth embodiment of the present invention is an aggregate composition including the cement additive of the first embodiment and an aggregate. By using both in combination, uniformity improves when they are added to the cement composition. As the aggregate, the aggregate described in the section of the cement composition of the third embodiment may be used.

As the content mass ratio between the cement additive and the aggregate in the aggregate composition, any appropriate content ratio may be adopted depending on the purpose. As such a content ratio, the content ratio of the cement additive (or water-absorbent resin) per 100 parts by mass of the aggregate is preferably 0.01 to 10 parts by mass, and more preferably 0.02 to 5 parts by mass.

<Molded Body>

A fifth embodiment of the present invention is a molded body obtained by molding a cement composition.

Formation of the molded body is not particularly limited, and is performed by a conventionally known method. Examples of the molding method include a method for pouring a cement composition into a mold, curing the cement composition together with the mold, and then demolding the mold, and a method for pouring a cement composition into a mold, and then curing the molded body demolded from the mold, and the like.

The curing method is not particularly limited, and may be any of underwater curing, sealed curing, and in-air curing. Curing may also be performed by applying a curing agent.

The molded body of the fifth embodiment may be used for various applications because the molded body withstands long-term use. Specifically, for example, structures such as buildings; concrete structures such as columns, piles, and side grooves, and the like may be given.

<Method for Improving Strength of Molded Body>

A sixth embodiment of the present invention is a method for improving strength of a molded body obtained by molding a cement composition containing cement, the method including containing the cement additive of the first embodiment to the cement composition.

The strength of the molded body may be more than 100%, preferably no less than 103%, more preferably no less than 105%, and still more preferably no less than 109% compared with the strength of the molded body before the cement additive is added. As the strength of the molded body after the cement additive is added, a value measured by sealing and curing the molded body for days by the method described in the following Examples is adopted.

EXAMPLES

The effects of the present invention will be described with reference to the following Examples and Comparative Examples. In Examples, the expressions "part(s)" or "%" mean "part(s) by mass" or "% by mass" unless otherwise specified. Unless otherwise specified, each operation is performed at room temperature (25° C.) and normal pressure.

Production Example 1

In a 1000 ml cylindrical separable flask, 29.9 g of acrylamide, 0.0974 g of N,N-methylenebisacrylamide, and 45.6 g of water were charged and uniformly dissolved. Here, in the monomer mixture composed of acrylamide and N,N-methylenebisacrylamide, acrylamide is in an amount of 99.85 mol %, and N,N-methylenebisacrylamide is 0.15 mol %. After the inside of the flask was replaced with nitrogen, the flask was heated to 45° C. in a hot water bath, 12.53 g of a 1% aqueous solution of sodium persulfate and 12.01 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrogel) was subdivided with a cutter, then dried with hot air at 130° C. for 3 hours, and pulverized with a mixer, then sieved with JIS standard sieves having mesh opening sizes of 500 μm and 250 μm. A powdery water-absorbent resin that had passed through the sieve having a mesh opening size of 500 μm and remained on the sieve having a mesh opening size of 250 μm was collected. No less than 90 mass % of the powdery water-absorbent resin was in the range of 45 to 850 μm. Further, no less than 90 mass % of the powdery water-absorbent resin was in the range of 100 to 850 μm. This powdery water-absorbent resin was used as a cement additive.

Production Example 2

In a 1000 ml cylindrical separable flask, 59.34 g of acrylamide, 0.647 g of N,N-methylenebisacrylamide, and 191.51 g of water were charged and uniformly dissolved. Here, in the monomer mixture composed of acrylamide and N,N-methylenebisacrylamide, acrylamide is in an amount of 99.49 mol %, and N,N-methylenebisacrylamide is 0.51 mol %. After the inside of the flask was replaced with nitrogen, the flask was heated to 45° C. in a hot water bath, 24.89 g of a 1% aqueous solution of sodium persulfate and 23.86 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer was subdivided with a cutter, then dried with hot air at 130° C. for 3 hours, and pulverized with a mixer, then sieved with JIS standard sieves having a mesh opening size of 500 μm and 250 μm. A powdery water-absorbent resin that had passed through the sieve having mesh opening sizes of 500 μm and remained on the sieve having a mesh opening size of 250 μm was collected. No less than 90 mass % of the powdery water-absorbent resin was in the range of 45 to 850 μm. Further, no less than 90 mass % of the powdery water-absorbent resin was in the range of 100 to 850 μm. This powdery water-absorbent resin was used as a cement additive.

Production Example 3

In a 1000 ml cylindrical separable flask, 58.73 g of acrylamide, 1.276 g of N,N-methylenebisacrylamide, and 191.96 g of water were charged and uniformly dissolved. Here, in the monomer mixture composed of acrylamide and N,N-methylenebisacrylamide, acrylamide is in an amount of 99.00 mol %, and N,N-methylenebisacrylamide is 1.00 mol %. After the inside of the flask was replaced with nitrogen, the flask was heated to 45° C. in a hot water bath, 24.66 g of a 1% aqueous solution of sodium persulfate and 23.64 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer was subdivided with a cutter, then dried with hot air at 130° C. for 3 hours, and pulverized with a mixer, then sieved with JIS standard sieves having mesh opening sizes of 500 μm and 250 μm. A powdery water-absorbent resin that had passed through the sieve having a mesh opening size of 500 μm and remained on the sieve having a mesh opening size of 250 μm was collected. No less than 90 mass % of the powdery water-absorbent resin was in the range of 45 to 850 μm. Further, no less than 90 mass % of the powdery water-absorbent resin was in the range of 100 to 850 μm. This powdery water-absorbent resin was used as a cement additive.

Production Example 4

In a 1000 ml cylindrical separable flask, 33.53 g of acrylamide, 25.43 g of hydroxyethyl methacrylate, 1.039 g of N,N-methylenebisacrylamide, and 200.55 g of water were charged and uniformly dissolved. Here, in the monomer mixture composed of acrylamide, hydroxyethyl methacrylate, and N,N-methylenebisacrylamide, acrylamide is in an amount of 70.00 mol %, hydroxyethyl methacrylate is 29.00 mol %, and N,N-methylenebisacrylamide is 1.00 mol %. After the inside of the flask was replaced with nitrogen, the flask was heated to 45° C. in a hot water bath, 20.05 g of a 1% aqueous solution of sodium persulfate and 19.4 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrogel) was subdivided with a cutter, then dried with hot air at 130° C. for 3 hours, and pulverized with a mixer, then sieved with JIS standard sieves having mesh opening sizes of 500 μm and 250 μm. A powdery water-absorbent resin that had passed through the sieve having a mesh size of 500 μm and remained on the sieve having a mesh size of 250 μm was collected. No less than 90 mass % of the powdery water-absorbent resin was in the range of 45 to 850 μm. Further, no less than 90 mass % of the powdery water-absorbent resin was in the range of 100 to 850 μm. This powdery water-absorbent resin was used as a cement additive.

Production Example 5

In a 1000 ml cylindrical separable flask, 42.4 g of acrylamide, 16.45 g of hydroxyethyl acrylate, 1.15 g of N,N-methylenebisacrylamide, and 196.34 g of water were charged and uniformly dissolved. Here, in the monomer mixture composed of acrylamide, hydroxyethyl acrylate, and N,N-methylenebisacrylamide, acrylamide is in an amount of 80.00 mol %, hydroxyethyl methacrylate is 19.00 mol %, and N,N-methylenebisacrylamide is 1.00 mol %. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrogel) was subdivided with a cutter, then dried with hot air at 130° C. for 3 hours, and pulverized with a mixer, then sieved with JIS standard sieves having mesh opening sizes of 500 μm and 250 μm. A powdery water-absorbent resin that had passed through the sieve having a mesh opening size of 500 μm and remained on the sieve having a mesh opening size of 250 μm was collected. No less than 90 mass % of the powdery water-absorbent resin was in the range of 45 to 850 μm. Further, no less than 90 mass % of the powdery water-absorbent resin was in the range of 100 to 850 μm. This powdery water-absorbent resin was used as a cement additive.

Production Example 6

In a 1000 ml cylindrical separable flask, 58.73 g of acrylamide, 1.276 g of N,N-methylenebisacrylamide, and 191.96 g of water were charged and uniformly dissolved. Here, in the monomer mixture composed of acrylamide and N,N-methylenebisacrylamide, acrylamide is in an amount of 99.00 mol %, and N,N-methylenebisacrylamide is 1.00 mol %. After the inside of the flask was replaced with nitrogen, the flask was heated to 45° C. in a hot water bath, 24.66 g of a 1% aqueous solution of sodium persulfate and 23.64 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrogel) was subdivided with a cutter, then dried with hot air at 130° C. for 3 hours, and pulverized with a mixer, then sieved with JIS standard sieves having mesh opening sizes of 710 μm and 500 μm. A powdery water-absorbent resin that had passed through the sieve having a mesh opening size of 710 μm and remained on the sieve having a mesh opening size of 500 μm was collected. No less than 90 mass % of the powdery water-absorbent resin was in the range of 45 to 850 μm. Further, no less than 90 mass % of the powdery water-absorbent resin was in the range of 100 to 850 μm. This powdery water-absorbent resin was used as a cement additive.

Production Example 7

In a 1000 ml cylindrical separable flask, 58.73 g of acrylamide, 1.276 g of N,N-methylenebisacrylamide, and 191.96 g of water were charged and uniformly dissolved. Here, in the monomer mixture composed of acrylamide and N,N-methylenebisacrylamide, acrylamide is in an amount of 99.00 mol %, and N,N-methylenebisacrylamide is 1.00 mol %. After the inside of the flask was replaced with nitrogen, the flask was heated to 45° C. in a hot water bath, 24.66 g of a 1% aqueous solution of sodium persulfate and 23.64 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrous gel) was subdivided with a cutter, then dried with hot air at 130° C. for 3 hours, and pulverized with a mixer, then sieved with JIS standard sieves having mesh sizes of 250 μm and 125 μm. A powdery water-absorbent resin that had passed through the sieve having a mesh opening size of 250 μm and remained on the sieve having a mesh opening size of 125 μm was collected. No less than 90 mass % of the powdery water-absorbent resin was in the range of 45 to 850 μm. Further, no less than 90 mass % of the powdery water-absorbent resin was in the range of 100 to 850 μm. This powdery water-absorbent resin was used as a cement additive.

Production Example 8

In a 1000 ml cylindrical separable flask, 47.92 g of acrylamide, 10.8 g of acrylic acid, 1.283 g of N,N-methylenebisacrylamide, and 191.27 g of water were charged and uniformly dissolved. Here, in the monomer mixture composed of acrylic acid, acrylamide and N,N-methylenebisacrylamide, acrylic acid is in an amount of 18.00 mol %, acrylamide is 81.00 mol %, and N,N-methylenebisacrylamide is 1.00 mol %. After the inside of the flask was replaced with nitrogen, the flask was heated to 45° C. in a hot water bath, 24.77 g of a 1% aqueous solution of sodium persulfate and 23.96 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrogel) was subdivided with a cutter, then dried with hot air at 130° C. for 3 hours, and pulverized with a mixer, then sieved with JIS standard sieves having mesh opening sizes of 500 μm and 250 μm. A powdery water-absorbent resin that had passed through the sieve having a mesh opening size of 500 μm and remained on the sieve having a mesh opening size of 250 μm was collected. No less than 90 mass % of the powdery water-absorbent resin was in the range of 45 to 850 μm. Further, no less than 90 mass % of the powdery water-absorbent resin was in the range of 100 to 850 μm. This powdery water-absorbent resin was used as a cement additive.

Production Example 9

In a 1000 ml cylindrical separable flask, 53.86 g of acrylamide, 4.96 g of acrylic acid, 1.18 g of N,N-methylenebisacrylamide, and 191.2 g of water were charged and uniformly dissolved. Here, in the monomer mixture composed of acrylic acid, acrylamide and N,N-methylenebisacrylamide, acrylic acid is in an amount of 9.00 mol %, acrylamide is 90.00 mol %, and N,N-methylenebisacrylamide is 1.00 mol %. After the inside of the flask was replaced with nitrogen, the flask was heated to 45° C. in a hot water bath, 24.81 g of a 1% aqueous solution of sodium persulfate and 24 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrogel) was subdivided with a cutter, then dried with hot air at 130° C. for 3 hours, and pulverized with a mixer, then sieved with JIS standard sieves having mesh opening sizes of 500 μm and 250 μm. A powdery water-absorbent resin that had passed through the sieve having a mesh opening size of 500 μm and remained on the sieve having a mesh opening size of 250 μm was collected. No less than 90 mass % of the powdery water-absorbent resin was in the range of 45 to 850 μm. Further, no less than 90 mass % of the powdery water-absorbent resin was in the range of 100 to 850 μm. This powdery water-absorbent resin was used as a cement additive.

Production Example 10

In a 1000 ml cylindrical separable flask, 56.31 g of acrylamide, 2.4 g of acrylic acid, 1.286 g of N,N-methylenebisacrylamide, and 191.18 g of water were charged and uniformly dissolved. Here, in the monomer mixture composed of acrylic acid, acrylamide and N,N-methylenebisacrylamide, acrylic acid is in an amount of 4.00 mol %, acrylamide is 95.00 mol %, and N,N-methylenebisacrylamide is 1.00 mol %. After the inside of the flask was replaced with nitrogen, the flask was heated to 45° C. in a hot water bath, 24.82 g of a 1% aqueous solution of sodium persulfate and 24.01 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrogel) was subdivided with a cutter, then dried with hot air at 130° C. for 3 hours, and pulverized with a mixer, then sieved with JIS standard sieves having mesh opening sizes of 500 μm and 250 μm. A powdery water-absorbent resin that had passed through the sieve having a mesh size of 500 μm and remained on the sieve having a mesh size of 250 μm was collected. No less than 90 mass % of the powdery water-absorbent resin was in the range of 45 to 850 μm. Further, no less than 90 mass % of the powdery water-absorbent resin was in the range of 100 to 850 μm. This powdery water-absorbent resin was used as a cement additive.

Production Example 11

In a 1000 ml cylindrical separable flask, 60.87 g of acrylamide, 2.13 g of triallyl isocyanurate, and 186.37 g of water were charged and uniformly dissolved. Here, in the monomer mixture composed of acrylamide and triallyl isocyanurate, acrylamide is 99.00 mol %, and triallyl isocyanurate is 1.00 mol %. After the inside of the flask was replaced with nitrogen, the flask was heated to 45° C. in a hot water bath, 26 g of a 1% aqueous solution of sodium persulfate and 24.92 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrogel) was subdivided with a cutter, then dried with hot air at 130° C. for 3 hours, and pulverized with a mixer, then sieved with JIS standard sieves having mesh opening sizes of 500 μm and 250 μm. A powdery water-absorbent resin that had passed through the sieve having a mesh opening size of 500 μm and remained on the sieve having a mesh opening size of 250 μm was collected. No less than 90 mass % of the powdery water-absorbent resin was in the range of 45 to 850 μm. Further, no less than 90 mass % of the powdery water-absorbent resin was in the range of 100 to 850 μm. This powdery water-absorbent resin was used as a cement additive.

Production Example 12

In a 1000 ml cylindrical separable flask, 3.8 g of acrylamide, 6.21 g of hydroxyethyl acrylate, 51.99 g of a product obtained by adding ethylene oxide to the hydroxyl group of 3-methyl-3-buten-1-ol (isoprenol) (average number of moles of added ethylene oxide: 50), 1.0 g of triallyl isocyanurate, and 229.02 g of water were charged, and uniformly dissolved. Here, in the monomer mixture composed of acrylamide, hydroxyethyl acrylate, 3-methyl-3-buten-1-ol (isoprenol) to which ethylene oxide is added (average number of moles of added ethylene oxide: 50), and triallyl isocyanurate, acrylamide is in an amount of 40 mol %, hydroxyethyl acrylate is 40 mol %, 3-methyl-3-buten-1-ol (isoprenol) to which ethylene oxide is added (average number of moles of added ethylene oxide: 50) is 17 mol %, and triallyl isocyanurate is 3 mol %. After the inside of the flask was replaced with nitrogen, the flask was heated to 45° C. in a hot water bath, 4.096 g of a 1% aqueous solution of sodium persulfate and 3.927 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrogel) was subdivided with a cutter, then dried with hot air at 130° C. for 3 hours, and pulverized with a mixer, then sieved with JIS standard sieves having mesh opening sizes of 500 μm and 250 μm. A powdery water-absorbent resin that had passed through the sieve having a mesh opening size of 500 μm and remained on the sieve having a mesh opening size of 250 μm was collected. No less than 90 mass % of the powdery water-absorbent resin was in the range of 45 to 850 μm. This powdery water-absorbent resin was used as a cement additive.

Production Example 13

In a 1000 ml cylindrical separable flask, 1.34 g of acrylamide, 61.31 g of a product obtained by adding ethylene oxide to the hydroxyl group of 3-methyl-3-buten-1-ol (isoprenol) (average number of moles of added ethylene oxide: 50), 0.35 g of triallyl isocyanurate, and 234.19 g of water were charged and uniformly dissolved. Here, in the monomer mixture composed of acrylamide, 3-methyl-3-buten-1-ol (isoprenol) to which ethylene oxide is added (average number of moles of added ethylene oxide: 50), and triallyl isocyanurate, acrylamide is in an amount of 40 mol %, 3-methyl-3-buten-1-ol (isoprenol) to which ethylene oxide is added (average number of moles of added ethylene oxide: 50) is 57 mol %, and triallyl isocyanurate is 3 mol %. After the inside of the flask was replaced with nitrogen, the flask was heated to 45° C. in a hot water bath, 1.44 g of a 1% aqueous solution of sodium persulfate and 1.381 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrogel) was subdivided with a cutter, then dried with hot air at 130° C. for 3 hours, and pulverized with a mixer, then sieved with JIS standard sieves having mesh opening sizes of 500 μm and 250 μm. A powdery water-absorbent resin that had passed through the sieve having a mesh opening size of 500 μm and remained on the sieve having a mesh opening size of 250 μm was collected. No less than 90 mass % of the powdery water-absorbent resin was in the range of 45 to 850 μm. This powdery water-absorbent resin was used as a cement additive.

Production Example 14

In a 1000 ml cylindrical separable flask, 3.83 g of acrylamide, 6.25 g of hydroxyethyl acrylate, 52.38 g of a product obtained by adding ethylene oxide to a hydroxyl group of 3-methyl-3-buten-1-ol (isoprenol) (average number of moles of added ethylene oxide: 50), 0.54 g of diethylene glycol diacrylate, and 228.96 g of water were charged, and uniformly dissolved. Here, in the monomer mixture composed of acrylamide, hydroxyethyl acrylate, 3-methyl-3-buten-1-ol (isoprenol) to which ethylene oxide is added (average number of moles of added ethylene oxide: 50), and diethylene glycol diacrylate, acrylamide is in an amount of 40 mol %, hydroxyethyl acrylate is 40 mol %, 3-methyl-3-buten-1-ol (isoprenol) to which ethylene oxide is added (average number of moles of added ethylene oxide: 50) is 17 mol %, and diethylene glycol diacrylate is 3 mol %. After the inside of the flask was replaced with nitrogen, the flask was heated to 45° C. in a hot water bath, 4.126 g of a 1% aqueous solution of sodium persulfate and 3.956 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrogel) was subdivided with a cutter, then dried with hot air at 130° C. for 3 hours, and pulverized with a mixer, then sieved with JIS standard sieves having mesh opening sizes of 500 μm and 250 μm. A powdery water-absorbent resin that had passed through the sieve having a mesh opening size of 500 μm and remained on the sieve having a mesh opening size of 250 μm was collected. No less than 90 mass % of the powdery water-absorbent resin was in the range of 45 to 850 μm. This powdery water-absorbent resin was used as a cement additive.

Production Example 15

In a 1000 ml cylindrical separable flask, 52.88 g of hydroxyethyl acrylate, 9.44 g of sodium 2-acrylamide-2-methylpropane sulfonate, 0.68 g of diethylene glycol diacrylate, and 207.37 g of water were charged, and uniformly dissolved. Here, in the monomer mixture composed of hydroxyethyl acrylate, sodium 2-acrylamide-2-methylpropane sulfonate, and diethylene glycol diacrylate, hydroxyethyl acrylate is in an amount of 90 mol %, sodium 2-acrylamide-2-methylpropane sulfonate is 9 mol %, and diethylene glycol diacrylate is 1 mol %. After the inside of the flask was replaced with nitrogen, the flask was heated to 45° C. in a hot water bath, 15.21 g of a 1% aqueous solution of sodium persulfate and 14.58 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrogel) was subdivided with a cutter, then dried with hot air at 130° C. for 3 hours, and pulverized with a mixer, then sieved with JIS standard sieves having mesh opening sizes of 500 μm and 250 μm. A powdery water-absorbent resin that had passed through the sieve having a mesh opening size of 500 μm and remained on the sieve having a mesh opening size of 250 μm was collected. No less than 90 mass % of the powdery water-absorbent resin was in the range of 45 to 850 μm. This powdery water-absorbent resin was used as a cement additive.

Comparative Production Example 1

In a 1000 ml cylindrical separable flask, 41.06 g of acrylamide, 18.74 g of acrylic acid, 0.19 g of N,N-methylenebisacrylamide, and 91.20 g of water were charged and uniformly dissolved. Here, in the monomer mixture composed of acrylic acid, acrylamide and N,N-methylenebisacrylamide, acrylic acid is in an amount of 31.00 mol %, acrylamide is 68.85 mol %, and N,N-methylenebisacrylamide is 0.15 mol %. After the inside of the flask was replaced with nitrogen, the flask was heated to 45° C. in a hot water bath, 24.80 g of a 2% aqueous solution of sodium persulfate and 23.99 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer was subdivided with a cutter, then dried with hot air at 130° C. for 3 hours, and pulverized with a mixer, then sieved with JIS standard sieves having mesh opening sizes of 500 μm and 250 μm. A powdery water-absorbent resin that had passed through the sieve having a mesh opening size of 500 μm and remained on the sieve having a mesh opening size of 250 μm was collected. No less than 90 mass % of the powdery water-absorbent resin was in the range of 45 to 850 μm. Further, no less than 90 mass % of the powdery water-absorbent resin was in the range of 100 to 850 μm. This powdery water-absorbent resin was used as a cement additive.

Comparative Production Example 2

In a 1000 ml cylindrical separable flask, 41.06 g of acrylamide, 18.74 g of acrylic acid, 0.19 g of N,N-methylenebisacrylamide, and 91.20 g of water were charged and uniformly dissolved. Here, in the monomer mixture composed of acrylic acid, acrylamide and N,N-methylenebisacrylamide, acrylic acid is in an amount of 31.00 mol %, acrylamide is 68.85 mol %, and N,N-methylenebisacrylamide is 0.15 mol %. After the inside of the flask was replaced with nitrogen, the flask was heated to 45° C. in a hot water bath, 24.80 g of a 2% aqueous solution of sodium persulfate and 23.99 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer was subdivided with a cutter, then dried with hot air at 130° C. for 3 hours, pulverized with a mixer, and then classified. The classification was performed in the same manner as in [117] to [119] of JP 2015-048386 A to obtain a powdery water-absorbent resin. This powdery water-absorbent resin was used as a cement additive. The average particle size of the powdery water-absorbent resin was 50 μm. The average particle sizes of Comparative Production Examples 2 and 3 were measured as follows; a laser diffraction particle size distribution analyzer LA-920 manufactured by HORIBA, Ltd. was used. The distribution form was set to standard, the particle size basis was set to volume, and the graph form was set to a bar graph. Then methanol was put in a sample bath to perform air venting and optical axis adjustment. Next, the sample was placed in the sample bath. At the same time as the sample was placed, ultrasonic waves were applied for 2 minutes, and then the sample concentration was adjusted such that the transmittance was 81 to 88%. The measurement was performed after the sample concentration was adjusted, and the ultrasonic treatment was performed again for 2 minutes.

Comparative Production Example 3

In a 1000 ml cylindrical separable flask, 41.06 g of acrylamide, 18.74 g of acrylic acid, 0.19 g of N,N-methylenebisacrylamide, and 91.20 g of water were charged and uniformly dissolved. Here, in the monomer mixture composed of acrylic acid, acrylamide and N,N-methylenebisacrylamide, acrylic acid is in an amount of 31.00 mol %, acrylamide is 68.85 mol %, and N,N-methylenebisacrylamide methylenebisacrylamide is 0.15 mol %. After the inside of the flask was replaced with nitrogen, the flask was heated to 45° C. in a hot water bath, 24.80 g of a 2% aqueous solution of sodium persulfate and 23.99 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer was subdivided with a cutter, then dried with hot air at 130° C. for 3 hours, pulverized with a mixer, and then classified. The classification was performed in the same manner as in [123] to [125] of JP 2015-048386 A to obtain a powdery water-absorbent resin. This powdery water-absorbent resin was used as a cement additive. The average particle size of the powdery water-absorbent resin was 15 μm.

Comparative Production Example 4

In a 1000 ml cylindrical separable flask, 59.99 g of acrylamide, 0.013 g of N,N-methylenebisacrylamide, and 191.07 g of water were charged and uniformly dissolved. Here, in the monomer mixture composed of acrylamide and N,N-methylenebisacrylamide, acrylamide is in an amount of 99.99 mol %, and N,N-methylenebisacrylamide is 0.01 mol %. After the inside of the flask was replaced with nitrogen, the flask was heated to 45° C. in a hot water bath, 24.87 g of a 1% aqueous solution of sodium persulfate and 24.06 g of a 0.1% aqueous solution of L-ascorbic acid were added thereto, stirring was stopped, and polymerization was carried out. After the start of polymerization, heat was generated, and the temperature rose to 80° C. after 10 minutes. When the increase in the liquid temperature was stopped, the bath temperature was raised to 80° C., and aging was performed for 30 minutes. The obtained gel-like polymer (hydrogel) was subdivided with a cutter, then dried with hot air at 130° C. for 3 hours, and pulverized with a mixer, then sieved with JIS standard sieves having opening mesh sizes of 500 μm and 250 μm. A powdery water-absorbent resin that had passed through the sieve having a mesh opening size of 500 μm and remained on the sieve having a mesh opening size of 250 μm was collected. No less than 90 mass % of the powdery water-absorbent resin was in the range of 45 to 850 μm. Further, no less than 90 mass % of the powdery water-absorbent resin was in the range of 100 to 850 μm. This powdery water-absorbent resin was used as a cement additive.

[Water Absorption Test Method]

A solution for water absorption test was prepared (pH 12.9) by mixing 1.72 g of $CaSO_4 \cdot 2H_2O$, 6.96 g of $Na_2SO_4$, 4.76 g of $K_2SO_4$, 7.12 g of KOH and 979.4 g of deionized water.

The powdery water-absorbent resin was accurately weighed in an amount of 0.2 g (mass W1 (g)), placed in a 4 cm×5 cm nonwoven fabric tea bag, and sealed by heat sealing. The tea bag was placed in a screw vial made of glass and having a specified volume of 50 mL, and immersed in 50 mL of the solution for water absorption test at room temperature (25° C.) and normal pressure for a predetermined time (5 mins, 2 hours, 28 days). Then, an end of the tea bag was gripped with tweezers, the tea bag was pulled up, and the tea bag was placed on a Kimtowel (manufactured by Nippon Paper Crecia Co., Ltd.) with one side of the tea bag facing downward, and was allowed to stand for 5 seconds. Subsequently, liquid draining was performed by placing the tea bag on the Kimtowel with the opposite side of the tea bag facing downward and allowing the tea bag to stand for 5 seconds, and then the mass (W2 (g)) of the tea bag was measured. Separately, the same operation was performed without using the water-absorbent resin, and the mass (W3 (g)) of the tea bag at that time was determined as a blank. The water absorption ratio calculated according to the following formula was defined as a liquid absorption capacity.

Water absorption ratio(g/g)= (W2(g)−W3(g))/W1(g)     [Mathematical formula 1]

The water absorption ratio of each powdery water-absorbent resin is described in the following Table 1.

TABLE 1

| Cement additive | Water absorption ratio (g/g) | | | |
|---|---|---|---|---|
| | 5 minutes | 2 hours | 5 days | 28 days |
| Production Example 1 | 11.8 | 16.5 | 37.3 | 38 |
| Production Example 2 | 12.2 | 16.9 | 38 | 39.5 |
| Production Example 3 | 9.7 | 13.4 | 29.3 | 31.4 |
| Production Example 4 | 13.1 | 17.6 | 26.7 | 29.9 |
| Production Example 5 | 13.3 | 17.9 | 27.4 | 30.2 |
| Production Example 6 | 9.5 | 13 | 28 | 31.4 |
| Production Example 7 | 11 | 14.2 | 29.9 | 31.5 |
| Production Example 8 | 17.1 | 19.6 | 29.8 | 32 |
| Production Example 9 | 15.9 | 19 | 29.1 | 31.8 |
| Production Example 10 | 14.1 | 18.1 | 30.3 | 31.5 |
| Production Example 11 | 10.6 | 12.8 | 27.4 | 29.4 |
| Production Example 12 | 8.9 | 13 | 30.3 | 34 |
| Production Example 13 | 9.3 | 13.2 | 28 | 32.8 |
| Production Example 14 | 9.3 | 13 | 30 | 34.4 |
| Production Example 15 | 15.9 | 19.1 | 29 | 32.9 |
| Comparative Production Example 1 | 24.4 | 28.4 | 31.5 | 31.5 |
| Comparative Production Example 2 | 24.9 | 27.8 | 31.4 | 31.4 |
| Comparative Production Example 3 | 27.5 | 30.5 | 31.4 | 31.4 |
| Comparative Production Example 4 | 15.1 | 22.1 | 35 | 39 |

From the above results, the powdery water-absorbent resins of Production Examples 1 to 15 had a water absorption ratio of no more than 20 g/g after an elapse of 5 minutes, and less than 20 g/g even after an elapse of 2 hours. The powdery water-absorbent resins had a high water absorption ratio of no less than 29 g/g after an elapse of 28 days. The powdery water-absorbent resin of Comparative Production Example 1 to 3 had a water absorption ratio of more than 20 g/g already after an elapse of 5 minutes. The powdery water-absorbent resin of Comparative Production Example 4 had a water absorption ratio of no more than 20 g/g after an elapse of 5 minutes, and had a water absorption ratio of more than 20 g/g after an elapse of 2 hours. From these results, it can be seen that the powdery water-absorbent resin of Production Example 1 to 15 exhibit high water absorption performance as time elapses while the water absorption performance is not so high at an initial stage of addition of water (up to about 2 hours).

The water absorption ratio of the powdery water-absorbent resin after a 5-minute immersion is preferably no more than 20 g/g, more preferably no more than 15 g/g, more preferably no more than 13 g/g, still more preferably no more than 12 g/g, particularly preferably no more than 11 g/g, and most preferably no more than 10 g/g according to the water absorption test method.

Production Example A: Production of Cement Dispersant

In a glass reaction vessel equipped with a Dimroth condenser, a stirring blade made of Teflon (registered trademark), a stirrer with a stirring seal, a nitrogen supply tube, and a temperature sensor, 80.0 parts of ion-exchanged water was charged. The water was heated to 70° C. while nitrogen was introduced at 200 mL/min under stirring at 250 rpm. Next, a mixed solution of 133.4 parts of methoxy polyethylene glycol monomethacrylic acid ester (average number of moles of added ethylene oxide: 9), 26.6 parts of methacrylic acid, 1.53 parts of mercaptopropionic acid, and 106.7 parts of ion-exchanged water was added dropwise over 4 hours, and at the same time, a mixed solution of 1.19 parts of ammonium persulfate and 50.6 parts of ion-exchanged water was added dropwise over 5 hours. After completion of the dripping, the temperature was maintained at 70° C. for 1 hour to complete polymerization reaction. Then, the mixture was neutralized with an aqueous solution of sodium hydroxide, whereby an aqueous solution of polycarboxylic acid-based copolymer containing a polymer as a cement dispersant (solid content: about 46.0 mass %) was obtained.

Production Example B: Production of Cement Dispersant

In a glass reaction vessel equipped with a Dimroth condenser, a stirring blade made of Teflon (registered trademark), a stirrer with a stirring seal, a nitrogen supply tube, and a temperature sensor, 198.2 parts of a product obtained by adding ethylene oxide to a hydroxyl group of 3-methyl-3-buten-1-ol (isoprenol) (hereinafter, referred to as IPN-50) (average number of moles of added ethylene oxide: 50) (80% aqueous solution), 0.32 parts of acrylic acid, 12.47 parts of hydrogen peroxide water (2% aqueous solution), and 44.75 parts of ion-exchanged water were charged, and the mixture was heated to 58° C. while nitrogen was introduced at 200 mL/min under stirring at 250 rpm. Next, a mixed solution of 27.12 parts of acrylic acid and 108.5 parts of ion-exchanged water was added dropwise over 3 hours, and at the same time, a mixed solution of 0.74 parts of L-ascorbic acid, 1.61 parts of 3-mercaptopropionic acid, and 86.31 parts of ion-exchanged water was added dropwise over 3 hours and 30 minutes. After completion of the dripping, the temperature was maintained at 58° C. for 1 hour to complete polymerization reaction. Then, the mixture was neutralized with an aqueous solution of sodium hydroxide, whereby an aqueous solution of polycarboxylic acid-based copolymer containing a polymer that is a cement dispersant (solid content: about 48.0 mass %) was obtained.

Production Example C: Production of Cement Dispersant

According to the production method of Production Example C-1 of JP 2018-111622 A, an aqueous solution of polycarboxylic acid-based copolymer containing a polymer as a cement dispersant (solid content: about 40 mass %) was obtained.

Production Example D: Production of Cement Dispersant

According to the production method of Production Example C-3 of JP 2018-111622 A, a polycarboxylic acid-based copolymer aqueous solution containing a polymer as a cement dispersant (solid content: about 40 mass %) was obtained.

Production Example E: Production of Cement Dispersant

According to the production method of Production Example C-4 of JP 2018-111622 A, an aqueous solution of polycarboxylic acid-based copolymer containing a polymer as a cement dispersant (solid content: about 40 mass %) was obtained.

Production Example F: Preparation of Cement Dispersant

MIGHTY 150 (formalin condensate of naphthalenesulfonate, manufactured by Kao Corporation, solid content: about 40 mass %) was used as a dispersant.

Production Example G: Preparation of Cement Dispersant

MasterPozzolith No. 8 (lignin sulfonic acid compound, manufactured by BASF Japan Ltd., solid content: about 100 mass %) was used as a dispersant.

Production Example H: Production of Cement Dispersant

A condensation reaction was performed in accordance with the method described in JP 2008-517080 A. Polyethylene glycol (average number of moles of added ethylene oxide: 20 moles) monophenyl ether and phenoxyethanol phosphate were condensed with formaldehyde to obtain an aqueous solution of a phosphoric acid-based dispersant containing a condensate in which the ratio between polyethylene glycol (average number of moles of added ethylene oxide: 20 moles) monophenyl ether and phenoxyethanol phosphate was 30/70 (mol %) and the weight average molecular weight (Mw) was 25000.

Evaluation Method 1: Mortar Test and Strength Test Method

A kneader for machine kneading, a spoon, a flow table, a flow cone, and a tamping rod conforming to JIS-R5201-1997 were used. At this time, unless otherwise specified, a mortar test was performed in accordance with JIS-R5201-1997.

The compositions of mortar (cement composition) are 587 g of ordinary Portland cement manufactured by Taiheiyo Cement Corporation (the amount not including the water-absorbent resin added below), 1350 g of standard sand for cement strength test conforming to JIS-R5201-1997, 264.1 g of ion-exchanged water (the copolymer solid content per 100 parts by mass of cement is 0.11 to 0.31 parts by mass, see the following Table 2) containing the aqueous solutions of copolymer (cement dispersant) obtained in Production Examples A to H and an antifoaming agent, and a powdery water-absorbent resin. The powdery water-absorbent resin was added in advance in an amount of 0.3 parts by mass (0.1 parts by mass in Examples 12 and 13) per 100 parts by mass of the cement and mixed with the cement. The antifoaming agent was added for the purpose of avoiding the influence of air bubbles on the dispersibility of the mortar composition such that air amount was no more than 4.0%. Specifically, an oxyalkylene-based antifoaming agent was used in an amount of 0.1% of the copolymer. When the air amount in the mortar was more than 4.0%, the amount of the antifoaming agent to add was adjusted so that the air amount was no more than 4.0%.

The mortar was prepared at room temperature (20±2° C.) for 4 minutes and 30 seconds with a Hobart type mortar mixer (model No. N-50, manufactured by Hobart Corporation). Specifically, a predetermined amount of cement and the powdery water-absorbent resin were put in a kneading bowl, and the bowl was attached to a kneader. The kneader was started at a low speed. Fifteen seconds after the paddle was started, water containing a predetermined amount of the cement dispersant and the antifoaming agent was charged in 15 seconds. Thereafter, sand was put therein, and the mixture was kneaded at a low speed for 30 seconds, then the speed was increased, and the mixture was continuously kneaded for 30 seconds. The kneading bowl was removed from the kneader and the kneading was stopped for 120 seconds. Then, the kneading bowl was attached to the kneader again, and the mixture was kneaded at a high speed for 60 seconds (after 4 minutes and 30 seconds from the start at a low speed at the beginning of the kneading). After that, the mixture was stirred 10 times with the spoon for each of the left and right. The mixed mortar was divided into two layers and packed in a flow cone placed on a flow table. Each layer was tamped 15 times over the entire surface so that the tip of the tamping rod went to about ½ of the depth of the layer, and finally the shortage was supplemented, the surface was leveled, and after 6 minutes from starting at the low speed first, the flow cone was lifted vertically, then the diameter of the mortar spread on the table was measured for two directions, and the average value was taken as the flow value.

In the measurement of air amount in mortar, the mortar was put into a 500 ml measuring cylinder, the weight and the volume were measured, and the difference between the measured volume and the volume when the air amount in the mortar to the put weight was 0% was calculated as the air amount.

After measuring the flow value and the air amount, mortar or concrete was poured into a mold to prepare a specimen for a compressive strength test, and the compressive strength after 28 days was measured under the following conditions.
Preparation of specimen: 50 mm×100 mm Specimen curing 1 (28 days, sealed): After performing constant temperature and humidity air curing at a temperature of about 20° C. and a humidity of 60% for 24 hours, the specimen was demolded from the mold, and wrapped with a polyethylene film so that water could not be exchanged between the surface of the mortar and the outside, then the specimen was sealed in a plastic bag and subjected to sealed curing for 27 days.

Specimen curing 2 (28 days, in air): After performing constant temperature and humidity in-air curing at a temperature of about 20° C. and a humidity of 60% for 24 hours, the specimen was demolded from the mold, and allowed to stand in the same environment as it was, and then subjected to in-air curing for 27 days.

Specimen polishing: specimen surface polishing (with specimen polishing finisher)

Compression strength measurement: automatic compression strength measuring device (Mayekawa Mfg. Co., Ltd.)

Evaluation Method 2: Funnel Flow Test Method

A mortar funnel flow test was performed as evaluation of piping passability at the time of pumping. When the mortar was not stuck on the way and flowed down in a short time, it was determined that the piping passability was good. A specific method of the funnel flow test is as follows.

A rubber plug was put on the lower end of a J14 funnel (upper end inner diameter: 70 mm, lower end inner diameter: 14 mm, height: 392 mm) specified in the Japan Society of Civil Engineers standard JSCE-F541, and the funnel was supported vertically with a stand. Next, an electronic scale for measuring the amount of mortar flowed out was installed below the lower end of the J14 funnel.

The obtained mortar was poured up to the upper surface of the J14 funnel, and the upper surface was leveled. Next, the rubber plug was removed, the mortar was caused to flow out, and the time from the start of the mortar outflow until 1200 g of the mortar flowed was measured with a stopwatch, and the time obtained was defined as a funnel flow-down time.

The results of Examples and Comparative Examples are shown in the following Table 2. The % in the column of 28-day strength is the percentage of each strength when the numerical value in the case of not adding the cement additive of the same cement dispersant is taken as 100%. Specifically, the % of each strength is a percentage considering the strength of Comparative example 1 as 100% for Example 1 to 13 and Comparative Examples 9 and 17, considering the strength of Comparative Example 2 as 100% for Example 14 and Comparative Example 10, considering the strength of Comparative Example 3 as 100% for Example 15 and Comparative Example 11, considering the strength of Comparative Example 4 as 100% for Example 16 and Comparative Example 12, considering the strength of Comparative Example 5 as 100% for Example 17 and Comparative Example 13, considering the strength of Comparative Example 6 as 100% for Example 18 and Comparative Example 14, considering the strength of Comparative Example 7 as 100% for Example 19 and Comparative Example 15, and considering the strength of Comparative Example 8 as 100% for Example 20 and Comparative Example 16.

TABLE 2-1

| Examples | Cement dispersant Kind | Parts by mass/100 parts by mass of cement | Cement additive Kind | Parts by mass/100 parts by mass of cement | Flow value mm | Air amount % | Flow-down time s | 28-day strength Sealed N/mm² | % | 28-day strength In-air N/mm² | % |
|---|---|---|---|---|---|---|---|---|---|---|---|
| 1 | Production Example A | 0.16 | Production Example 1 | 0.3 | 188 | 2.1 | 6.4 | 64.7 | 109 | 47.6 | 112 |
| 2 | Production Example A | 0.14 | Production Example 2 | 0.3 | 193 | 3.2 | 10.1 | 65.4 | 111 | 48.9 | 115 |
| 3 | Production Example A | 0.13 | Production Example 3 | 0.3 | 189 | 3.1 | 13.3 | 62.8 | 106 | 46.8 | 110 |
| 4 | Production Example A | 0.14 | Production Example 4 | 0.3 | 192 | 3 | 10.1 | 66.1 | 112 | 50.2 | 118 |
| 5 | Production Example A | 0.14 | Production Example 5 | 0.3 | 192 | 3.3 | 11.1 | 65.3 | 110 | 49.3 | 116 |
| 6 | Production Example A | 0.13 | Production Example 6 | 0.3 | 188 | 2.2 | 8.9 | 63.4 | 107 | 46.8 | 110 |
| 7 | Production Example A | 0.13 | Production Example 7 | 0.3 | 188 | 2.8 | 10.1 | 63.8 | 108 | 46.3 | 109 |
| 8 | Production Example A | 0.18 | Production Example 8 | 0.3 | 189 | 3.1 | 13.9 | 64.9 | 110 | 50.6 | 119 |
| 9 | Production Example A | 0.17 | Production Example 9 | 0.3 | 188 | 2.9 | 12.9 | 65.2 | 110 | 51.0 | 120 |
| 10 | Production Example A | 0.16 | Production Example 10 | 0.3 | 188 | 2.9 | 12.3 | 65.2 | 110 | 50.2 | 118 |
| 11 | Production Example A | 0.13 | Production Example 11 | 0.3 | 189 | 2.2 | 12.2 | 65.2 | 111 | 48.9 | 115 |
| 12 | Production Example A | 0.13 | Production Example 2 | 0.1 | 195 | 3.2 | 9.9 | 62.2 | 105 | 45.1 | 106 |
| 13 | Production Example A | 0.12 | Production Example 3 | 0.1 | 193 | 3.1 | 10 | 62.9 | 106 | 45.5 | 107 |
| 14 | Production Example B | 0.12 | Production Example 3 | 0.3 | 191 | 2.9 | 11.2 | 62.9 | 106 | 48.1 | 113 |
| 15 | Production Example C | 0.12 | Production Example 3 | 0.3 | 189 | 3.2 | 13.4 | 64.7 | 110 | 47.6 | 112 |
| 16 | Production Example D | 0.12 | Production Example 3 | 0.3 | 190 | 2.6 | 12.1 | 63.4 | 107 | 46.8 | 110 |
| 17 | Production Example E | 0.12 | Production Example 3 | 0.3 | 189 | 2.5 | 14.1 | 65.1 | 110 | 49.0 | 115 |
| 18 | Production Example F | 0.18 | Production Example 3 | 0.3 | 190 | 2.2 | 12 | 65.1 | 110 | 46.9 | 110 |
| 19 | Production Example G | 0.18 | Production Example 3 | 0.3 | 191 | 3 | 12.9 | 65.1 | 110 | 46.9 | 110 |
| 20 | Production Example H | 0.18 | Production Example 3 | 0.3 | 194 | 2.8 | 12.3 | 65.1 | 110 | 46.4 | 109 |

TABLE 2-2

| Comparative Examples | Cement dispersant Kind | Parts by mass/100 parts by mass of cement | Cement additive Kind | Parts by mass/100 parts by mass of cement | Flow value mm | Air amount % | Flow-down time s | 28-day strength Sealed N/mm² | % | 28-day strength In-air N/mm² | % |
|---|---|---|---|---|---|---|---|---|---|---|---|
| 21 | Production Example A | 0.12 | Production Example 12 | 0.3 | 191 | 2.2 | 8.4 | 64.4 | 109 | 49.9 | 117 |

TABLE 2-2-continued

| Comparative Examples | Cement dispersant Kind | Parts by mass/100 parts by mass of cement | Cement additive Kind | Parts by mass/100 parts by mass of cement | Flow value mm | Air amount % | Flow-down time s | 28-day strength Sealed N/mm² | % | 28-day strength In-air N/mm² | % |
|---|---|---|---|---|---|---|---|---|---|---|---|
| 22 | Production Example B | 0.12 | Production Example 12 | 0.3 | 190 | 2.2 | 8.9 | 64.4 | 109 | 49.3 | 116 |
| 23 | Production Example C | 0.12 | Production Example 12 | 0.3 | 197 | 2.3 | 8.9 | 64.4 | 109 | 49.4 | 116 |
| 24 | Production Example A | 0.12 | Production Example 13 | 0.3 | 194 | 2.7 | 9.2 | 64.5 | 109 | 50.0 | 118 |
| 25 | Production Example B | 0.12 | Production Example 13 | 0.3 | 195 | 2.9 | 8.9 | 64.7 | 109 | 50.0 | 117 |
| 26 | Production Example C | 0.12 | Production Example 13 | 0.3 | 192 | 3 | 10.2 | 65 | 110 | 49.7 | 117 |
| 27 | Production Example A | 0.12 | Production Example 14 | 0.3 | 192 | 3 | 9 | 64 | 108 | 49.9 | 117 |
| 28 | Production Example B | 0.12 | Production Example 14 | 0.3 | 192 | 2.3 | 9.9 | 65.1 | 110 | 50.4 | 118 |
| 29 | Production Example C | 0.12 | Production Example 14 | 0.3 | 193 | 2.4 | 8.9 | 65.2 | 111 | 50.4 | 119 |
| 30 | Production Example D | 0.12 | Production Example 14 | 0.3 | 190 | 2.4 | 9 | 65.9 | 112 | 51.0 | 120 |
| 31 | Production Example E | 0.12 | Production Example 14 | 0.3 | 192 | 2.8 | 9.4 | 65 | 110 | 50.5 | 119 |
| 32 | Production Example F | 0.18 | Production Example 14 | 0.3 | 193 | 2.3 | 9.1 | 63.9 | 108 | 50.6 | 119 |
| 33 | Production Example G | 0.18 | Production Example 14 | 0.3 | 197 | 2.2 | 9.9 | 65 | 110 | 49.9 | 117 |
| 34 | Production Example H | 0.18 | Production Example 14 | 0.3 | 196 | 2.3 | 10 | 65.1 | 110 | 50.1 | 118 |
| 35 | Production Example A | 0.12 | Production Example 15 | 0.3 | 192 | 2.8 | 12 | 63.9 | 108 | 48.0 | 113 |

TABLE 2-3

| Examples | Cement dispersant Kind | Parts by mass/100 parts by mass of cement | Cement additive Kind | Parts by mass/100 parts by mass of cement | Flow value mm | Air amount % | Flow-down time s | 28-day strength Sealed N/mm² | % | 28-day strength In-air N/mm² | % |
|---|---|---|---|---|---|---|---|---|---|---|---|
| 1 | Production Example A | 0.11 | — | — | 195 | 2 | 6.8 | 59.1 | — | 42.5 | — |
| 2 | Production Example B | 0.11 | — | — | 200 | 1.2 | 7.5 | 59.2 | — | 42.6 | — |
| 3 | Production Example C | 0.11 | — | — | 196 | 2 | 7.3 | 59 | — | 42.5 | — |
| 4 | Production Example D | 0.11 | — | — | 195 | 1.9 | 7.5 | 59 | — | 42.5 | — |
| 5 | Production Example E | 0.11 | — | — | 193 | 1.9 | 7.2 | 59.2 | — | 42.6 | — |
| 6 | Production Example F | 0.15 | — | — | 200 | 1.9 | 7.5 | 59 | — | 42.6 | — |
| 7 | Production Example G | 0.15 | — | — | 199 | 2 | 8 | 59.1 | — | 42.6 | — |
| 8 | Production Example H | 0.15 | — | — | 199 | 2 | 8.3 | 59.2 | — | 42.6 | — |
| 9 | Production Example A | 0.25 | Comparative Production Example 1 | 0.3 | 187 | 2.2 | 20.5 | 67.4 | 114 | 49.3 | 116 |
| 10 | Production Example B | 0.22 | Comparative Production Example 1 | 0.3 | 200 | 2 | 30 | 65.1 | 110 | 49.0 | 115 |
| 11 | Production Example C | 0.22 | Comparative Production Example 1 | 0.3 | 193 | 2 | 29 | 66.1 | 112 | 48.0 | 113 |

TABLE 2-3-continued

| | Cement dispersant | | Cement additive | | | | | 28-day strength Sealed | | 28-day strength In-air | |
|---|---|---|---|---|---|---|---|---|---|---|---|
| Examples | Kind | Parts by mass/100 parts by mass of cement | Kind | Parts by mass/100 parts by mass of cement | Flow value mm | Air amount % | Flow-down time s | N/mm² | % | N/mm² | % |
| 12 | Production Example D | 0.22 | Comparative Production Example 1 | 0.3 | 196 | 2.1 | 28.5 | 65.5 | 111 | 48.0 | 113 |
| 13 | Production Example E | 0.22 | Comparative Production Example 1 | 0.3 | 197 | 2.1 | 29 | 66.3 | 112 | 48.6 | 114 |
| 14 | Production Example F | 0.31 | Comparative Production Example 1 | 0.3 | 200 | 2.1 | 29 | 66.1 | 112 | 48.6 | 114 |
| 15 | Production Example G | 0.31 | Comparative Production Example 1 | 0.3 | 199 | 1.9 | 29.5 | 66.8 | 113 | 48.6 | 114 |
| 16 | Production Example H | 0.3 | Comparative Production Example 1 | 0.3 | 199 | 1.9 | 28 | 66.3 | 112 | 48.6 | 114 |
| 17 | Production Example A | 0.19 | Comparative Production Example 4 | 0.3 | 200 | 2 | 21 | 74.1 | 110 | 57.7 | 117 |

From the above results, in the cement compositions using the cement additives of Examples, the same flow value was obtained with the same amount of the dispersant as in Comparative Examples 1 to 8 in which the cement additive was not added. In the cement compositions having the same flow value (fluidity), the cement composition using the cement additive of Example had a smaller amount of cement dispersant than the cement composition using the cement additive of Comparative Example 9 to 17. In addition, it was found that the cement composition using the cement additive of Examples has low viscosity and excellent pumping performance from the short flow-down time. In addition, the strength of the cement composition using the cement additive of Examples improved in sealed and in-air curing for 28 days as compared with Comparative Example 1 to 8 in which the cement additive was not added.

Note that the sealed curing and in-air curing are curing conditions of an actual structure. It is considered that the sealed curing indicates the strength of the inside of the structure, and the in-air curing indicates the strength of the surface of the structure. The cement compositions of Example are expected to improve the strength of the actual structure because the strength improving effect in sealed and in-air curing is remarkably high as compared with Comparative Examples in which the cement additive is not added.

On the other hand, in Comparative Examples 9 to 16 using a powdery water-absorbent resin in which the anionic monomer was contained in an amount of more than 20 mol % in the monomer mixture (Comparative Production Example 1) and Comparative Example 17 using a powdery water-absorbent resin in which the nonionic crosslinkable monomer was contained in an amount of less than 0.1 mol % in the monomer mixture (Comparative Production Example 4), it was necessary to blend a large amount of dispersant in order to obtain the same flow value (fluidity). In addition, because the cement compositions of Comparative Examples 9 to 17 had a long flow-down time, it had high viscosity and was poor in terms of work.

Evaluation Method 3: Concrete Test and Strength Test Method

A cement composition was prepared using ordinary Portland cement (manufactured by Taiheiyo Cement Corporation) as a cement, land sand from Oi River Water System as a fine aggregate, crushed stone from Qinghai as a coarse aggregate, and tap water as a kneading water, with the blending amount of cement: 382 kg/m³, water: 172 kg/m³, fine aggregate: 796 kg/m³, coarse aggregate: 930 kg/m³, with the fine aggregate ratio (fine aggregate/fine coarse aggregate+coarse aggregate) (volume ratio): 47%, and using the cement dispersant and the powdery water-absorbent resin with the blending ratios shown in the following Table 3. The water/cement ratio (mass ratio) was 0.45. The powdery water-absorbent resin was previously added in an amount of 0.3 parts by mass per 100 parts by mass of cement and mixed with the cement.

The materials used for the measurement, a forced kneading mixer, and the measuring instruments were temperature-controlled in the above-described measurement temperature atmosphere so that the temperature of the cement composition was 20° C., and kneading and each measurement were performed in the measurement temperature atmosphere. In addition, in order to avoid the influence of the air bubbles in the cement composition on the fluidity of the cement composition, an oxyalkylene-based antifoaming agent was used as necessary, and the air amount was adjusted to 4.5±0.5%.

Under the above conditions, concrete was produced using the forced kneading mixer with a kneading time of 90 seconds, and the flow value and the air amount were measured. The flow value and the air amount were measured in accordance with Japanese Industrial Standards (JIS-A-1101:2014, 1128:2014). In addition, the amount of the cement dispersant added was an amount added at which the flow value was 375 mm to 425 mm.

After the flow value and the air amount were measured, the specimen for a compressive strength test was prepared, and the compressive strength after 28 days was measured under the following conditions.
Preparation of specimen: 100 mm×200 mm Specimen curing (28 days): After constant temperature and humidity air curing at a temperature of about 20° C. and a humidity of 60% was performed for 24 hours, the specimen was wrapped with a polyethylene film so that water could not be exchanged between the concrete surface and the outside, then the specimen was sealed in a plastic bag and subjected to sealed curing for 27 days.

Specimen polishing: specimen surface polishing (with specimen polishing finisher)

Compression strength measurement: automatic compression strength measuring device (Mayekawa Mfg. Co., Ltd.)

The results are shown in Table 3 below.

Evaluation Method 4: Funnel Flow Test Method

A mortar funnel flow test was performed as evaluation of piping passability at the time of pumping. When the mortar was not stuck on the way and flowed down in a short time, it was determined that the piping passability was good. A specific method of the funnel flow test is as follows.

A V-shaped funnel was used as an index representing the viscosity of concrete, and a flow-down time in the V-shaped funnel of fresh concrete immediately after filling was measured in accordance with "Flow-down test method of high fluidity concrete using funnel (draft) (JSCE-F512-2007)" ("Standard Specification for Concrete Structures, 2007, Test Methods and Specifications, JSCE Test Methods and Specifications and Related Test Methods and Specifications" edited by Sub-Committee on Test Methods and Specifications for concrete of JSCE Concrete Committee, Japan Society of Civil Engineers, May 2007, first printing, pp. 198-199).

The results are shown in Table 3 below. In the column of flow-down time in Table 3, "stuck" refers to a state in which the viscosity is too high and the concrete is stuck in the V-shaped funnel, and all of the concrete does not flow out.

From the above results, in the cement compositions using the cement additives of Examples, the same flow value was obtained with the amount of the dispersant being equal to or smaller than that in Comparative Example 18 in which the cement additive was not added. In the cement composition having the same flow value (fluidity), the cement composition using the cement additive of Example had a smaller amount of cement dispersant than the cement composition using the cement additive of Comparative Example 19 to 21. In addition, it was found that the cement composition using the cement additive of Examples has low viscosity and excellent pumping performance from the short flow-down time. In addition, the strength of the cement composition using the cement additive of Examples improved in sealed and in-air curing for 28 days as compared with Comparative Example 18 in which the cement additive was not added.

On the other hand, in Comparative Examples 19 to 21 using a powdery water-absorbent resin (Comparative Production Examples 1 to 3) in which the anionic monomer accounted for more than 20 mol % in the monomer mixture, it was necessary to add a large amount of a dispersant in order to obtain the same flow value (fluidity). In addition, because the cement compositions of Comparative Examples 19 to 21 had a long flow-down time, it had high viscosity and was poor in terms of work.

The present application is based on Japanese Patent Application No. 2019-074148 filed on Apr. 9, 2019, the disclosure of which is incorporated herein by reference in its entirety.

The invention claimed is:

1. A cement admixture comprising a cement additive and a cement dispersant, wherein the cement dispersant is a polycarboxylic acid-based dispersant,

TABLE 3

| | Cement dispersant | | Cement additive | | | | | | | |
|---|---|---|---|---|---|---|---|---|---|---|
| | Kind | Parts by mass/100 parts by mass of cement | Kind | Parts by mass/100 parts by mass of cement | Flow value mm | Air amount % | Flow-down time s | 28-day strength Sealed N/mm$^2$ | % | 28-day strength In-air N/mm$^2$ | % |
| Examples | | | | | | | | | | | |
| 21 | Production Example A | 0.25 | Production Example 2 | 0.3 | 400 | 4.4 | 17 | 54.0 | 112 | 42.0 | 114 |
| 22 | Production Example A | 0.24 | Production Example 3 | 0.3 | 400 | 4.3 | 16.9 | 54.0 | 112 | 42.0 | 114 |
| 23 | Production Example A | 0.24 | Production Example 6 | 0.3 | 410 | 4.4 | 16.8 | 54.5 | 113 | 41.2 | 112 |
| Comparative Examples | | | | | | | | | | | |
| 18 | Production Example A | 0.22 | — | — | 405 | 4.3 | 9.2 | 48.2 | 100 | 36.8 | 100 |
| 19 | Production Example A | 0.62 | Comparative Production Example 1 | 0.3 | 408 | 4.4 | 75.8 | 57.6 | 119 | no data | no data |
| 20 | Production Example A | 0.88 | Comparative Production Example 2 | 0.3 | 400 | 4 | stuck | 57.0 | 118 | no data | no data |
| 21 | Production Example A | 1.54 | Comparative Production Example 3 | 0.3 | 413 | 4.8 | stuck | 52.9 | 110 | no data | no data | the cement additive comprises a water-absorbent resin, the water-absorbent resin is formed by polymerizing a monomer mixture containing no less than 50 mol % of a nonionic non-crosslinkable monomer and no less than 0.1 mol % of a nonionic crosslinkable monomer, a content of an anionic monomer in the monomer mixture is no more than 4 mol %, the nonionic non-crosslinkable monomer is not N-vinylacylamides, and a water absorption ratio when the water-absorbent resin is immersed in an aqueous solution having a pH of 12.9 (here, the aqueous solution having a pH of 12.9 is an aqueous solution obtained by mixing 1.72 g of $CaSO_4 \cdot 2H_2O$, 6.96 g of $Na_2SO_4$, 4.76 g of $K_2SO_4$, 7.12 g of KOH, and 979.4 g of deionized water) at 25° C. for 2 hours is less than 20 g/g.

2. The cement admixture according to claim 1, wherein a water absorption ratio when the water-absorbent resin is immersed in the aqueous solution having a pH of 12.9 at 25° C. for 28 days is no less than 20 g/g.

3. The cement admixture according to claim 1, wherein no less than 90 mass % of the water-absorbent resin has a size in a range of 45 to 850 μm.

4. The cement admixture according to claim 1, wherein the nonionic non-crosslinkable monomer is water-soluble.

5. The cement admixture according to claim 1, wherein the nonionic non-crosslinkable monomer contains a (meth)acrylamide-based monomer.

6. A cement composition comprising a cement additive, a cement dispersant, and cement, wherein the cement dispersant is a polycarboxylic acid-based dispersant, the cement additive comprises a water-absorbent resin, the water-absorbent resin is formed by polymerizing a monomer mixture containing no less than 50 mol % of a nonionic non-crosslinkable monomer and no less than 0.1 mol % of a nonionic crosslinkable monomer, a content of an anionic monomer in the monomer mixture is no more than 4 mol %, the nonionic non-crosslinkable monomer is not N-vinylacylamides, and a water absorption ratio when the water-absorbent resin is immersed in an aqueous solution having a pH of 12.9 (here, the aqueous solution having a pH of 12.9 is an aqueous solution obtained by mixing 1.72 g of $CaSO_4 \cdot 2H_2O$, 6.96 g of $Na_2SO_4$, 4.76 g of $K_2SO_4$, 7.12 g of KOH, and 979.4 g of deionized water) at 25° C. for 2 hours is less than 20 g/g.

7. A molded body obtained by molding the cement composition according to claim 6.

8. A method for improving strength of a molded body obtained by molding a cement composition containing cement, the method comprising:

incorporating a cement additive to the cement composition, wherein the strength of the molded body is improved to be more than 100% as compared to a strength of a molded body obtained without the cement additive, the cement composition further comprises a cement dispersant, and the cement dispersant is a polycarboxylic acid-based dispersant, the cement additive comprises a water-absorbent resin, the water-absorbent resin is formed by polymerizing a monomer mixture containing no less than 50 mol % of a nonionic non-crosslinkable monomer and no less than 0.1 mol % of a nonionic crosslinkable monomer, a content of an anionic monomer in the monomer mixture is no more than 4 mol %, the nonionic non-crosslinkable monomer is not N-vinylacylamides, and a water absorption ratio when the water-absorbent resin is immersed in an aqueous solution having a pH of 12.9 (here, the aqueous solution having a pH of 12.9 is an aqueous solution obtained by mixing 1.72 g of $CaSO_4 \cdot 2H_2O$, 6.96 g of $Na_2SO_4$, 4.76 g of $K_2SO_4$, 7.12 g of KOH, and 979.4 g of deionized water) at 25° C. for 2 hours is less than 20 g/g.

9. The cement admixture according to claim 1, wherein the nonionic non-crosslinkable monomer comprises at least one selected from the group consisting of (meth)acrylamide-based monomers, N-vinyl lactam-based monomers, hydroxy (meth)acrylates, unsaturated amines, vinyl cyanide-based monomers and unsaturated polyalkylene glycol alkenyl ether-based monomer represented by the following general formula (1):

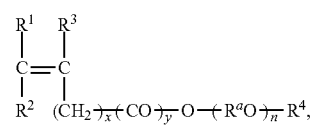

wherein $R^1$, $R^2$, and $R^3$ independently represent a hydrogen atom or a methyl group, $R^4$ represents a hydrogen atom or a hydrocarbon group having 1 to 30 carbon atoms, $R^aO$ represents an oxyalkylene group having 2 to 18 carbon atoms, n is a number of 1 to 500, x is an integer of 0 to 2, and y is 0 or 1.

10. The cement admixture according to claim 1, wherein a water absorption ratio when the water-absorbent resin is immersed in the aqueous solution having a pH of 12.9 at 25° C. for 28 days is no less than 20 g/g.

11. The cement admixture according to claim 1, wherein the content of the anionic monomer in the monomer mixture is no more than 3 mol %.

* * * * *